(12) United States Patent
Kang et al.

(10) Patent No.: US 7,006,853 B2
(45) Date of Patent: Feb. 28, 2006

(54) ROTARY TYPE HINGE MODULE FOR PORTABLE WIRELESS TERMINAL

(75) Inventors: Sung-Ill Kang, Kumi-shi (KR); Jong-Gun Bae, Kumi-shi (KR); Sung-June Hwang, Kumi-shi (KR); Byeong-Ro Jeong, Seoul (KR); Yong-Jin Lee, Kyonggi-do (KR)

(73) Assignee: Samsung Electronics Co., Ltd., (KR)

( * ) Notice: Subject to any disclaimer, the term of this patent is extended or adjusted under 35 U.S.C. 154(b) by 503 days.

(21) Appl. No.: 10/226,712

(22) Filed: Aug. 23, 2002

(65) Prior Publication Data

US 2003/0040288 A1 Feb. 27, 2003

(30) Foreign Application Priority Data

| | | | |
|---|---|---|---|
| Aug. 24, 2001 | (KR) | ............................... | 2001-51282 |
| Jun. 4, 2002 | (KR) | ............................... | 2002-31342 |
| Jun. 15, 2002 | (KR) | ............................... | 2002-41354 |

(51) Int. Cl.
*H04B 1/38* (2006.01)

(52) U.S. Cl. ............................... 455/575.3; 455/575.1; 455/575.8; 455/550.1; 455/556.1; 455/556.2; 455/556

(58) Field of Classification Search ............. 455/575.3, 455/575.1, 575.8, 550.1, 556.1–556.2, 566
See application file for complete search history.

(56) References Cited

U.S. PATENT DOCUMENTS

| | | | |
|---|---|---|---|
| 5,016,849 A | 5/1991 | Wu | |
| 6,065,187 A | 5/2000 | Mischenko | |
| 6,091,938 A * | 7/2000 | Go | ........................... 455/575.3 |
| 6,115,886 A * | 9/2000 | Fujita | ........................... 16/330 |
| 6,175,990 B1 * | 1/2001 | Kato et al. | ..................... 16/334 |
| 6,275,376 B1 | 8/2001 | Moon | |
| 6,292,980 B1 | 9/2001 | Yi et al. | |
| 6,549,789 B1 * | 4/2003 | Kfoury | ..................... 455/575.3 |
| 6,766,180 B1 * | 7/2004 | Doraiswamy et al. | ... 455/575.1 |

FOREIGN PATENT DOCUMENTS

CN 1251927 A 3/2000

OTHER PUBLICATIONS

Chinese Office Action dated Dec. 26, 2003 issued in a counterpart application, namely, Appln. No. 02152927.2.

* cited by examiner

*Primary Examiner*—Lee Nguyen
*Assistant Examiner*—Wen Huang
(74) *Attorney, Agent, or Firm*—Dilworth & Barrese, LLP

(57) ABSTRACT

A hinge system of a portable wireless terminal not only enables a folder to be opened from a terminal body but also enables front and rear surfaces of a folder of a portable wireless terminal to be turned over. The hinge system a folder-opening hinge module and a rotary-type hinge module, the cooperation of which realizes the above operation. The rotary-type hinge module includes a hinge housing rotatably assembled with the terminal body, a supporting shaft fixed to the hinge housing, and a rotary shaft rotatably assembled with the supporting shaft. The rotary shaft is connected with the folder and can be rotated with respect to the terminal body, thereby enabling the folder to be turned over in a state that the folder is opened.

32 Claims, 18 Drawing Sheets

ROTARY TYPE HINGE MODULE FOR PORTABLE WIRELESS TERMINAL

PRIORITY

The application claims priority to Korean Patent Application Serial No.: 51282/2001, filed Aug. 24, 2001, 31342/2002, filed Jun. 4, 2002 and 41354/2002, filed Jul. 15, 2002, the contents of each of which are hereby incorporated by reference.

BACKGROUND OF THE INVENTION

1. Field of the Invention

The present invention relates to a hinge module of a portable wireless terminal, and more particularly to a rotary type hinge module, which enables a flip or folder to be rotated while the rotary type hinge module itself can rotate with respect to a terminal body.

2. Description of the Prior Art

As generally known in the art, portable wireless terminals may be classified into those of bar type, flip type, and folder type, according to the shapes of the terminals.

In the bar-type terminal, which employs data input/output means and transmission/receiving module installed in a housing of one terminal body, a keypad through which data is inputted and which is always exposed may be misoperated, and there is a limitation in reducing the dimension of the terminal since a predetermined distance must be secured between a transmission section and a receiving section.

The flip-type terminal includes a terminal body, a flip, and a hinge system connecting the terminal body and the flip with each other. In the flip-type terminal, data input/output means and transmission/receiving module are installed in a housing of the terminal body, and the flip covers a keypad which is the data input means, thereby preventing the keypad from being misoperated. However, there is also a limitation in reducing the dimension of the flip-type terminal due to the problem of a predetermined distance to be secured between a transmission section and a receiving section.

The folder-type terminal includes a terminal body, a folder, and a hinge system connecting the terminal body and the folder with each other, and is opened or closed by rotating the folder. When the terminal is in a communication-waiting mode, the folder is in tight contact with the terminal body, so that the keypad can be prevented from being misoperated. When the terminal is in a communication mode, the folder is unfolded, so that a sufficient distance can be secured between a transmission section and a receiving section, which makes the folder-type terminal be advantageous in reducing the dimension of the terminal. Due to this reason, it is a current trend that the folder-type terminal is gradually becoming a main type of portable wireless terminal.

In the flip-type terminal or the folder-type terminal described above, the flip or folder and the terminal body are rotatably assembled with each other by the hinge system. The hinge system generates a force. The force is applied to the flip or folder in a direction which enables the flip or folder to be opened when the flip or folder has been rotated further than a predetermined angle, or in a direction which forces the flip or folder to be in tight contact with the terminal body when the flip or folder has been rotated less than a predetermined angle.

U.S. Pat. No. 6,292,980, issued to the present applicant on Sep. 25, 2001, discloses one of the conventional hinge systems as described above. In the disclosed hinge system, a hinge cam having a mountain-shaped portion, a hinge shaft having a valley-shaped portion, and a spring forcing the hinge cam and the hinge shaft to be in tight contact with each other are received in a hinge housing. The folder or flip can be opened or closed by exerting an opening force that overcomes the elastic force of the spring and curved surfaces of the mountain-shaped portion and the valley-shaped portion.

As the mobile communication service gradually becomes more and more diversified, the functions of the terminals also become rapidly diversified. However, the conventional hinge systems have a function of simply opening or closing the flip or folder from a terminal body. As a result, this limits changing the configuration of the terminal, for example, in adding additional devices to the terminal in order to realize various mobile communication service required by customers. Moreover, the conventional hinge systems not only have restrictions in changing particulars or design of the terminal, but also cannot meet the preferences of customers nor follow the current trend of providing various mobile communication services.

SUMMARY OF THE INVENTION

Accordingly, the present invention has been made to solve the above-mentioned problems occurring in the prior art, and an object of the present invention is to provide a hinge system, which is advantageous in changing the configuration of a portable wireless terminal.

It is another object of the present invention to provide a hinge system, which enables front and rear surfaces of a folder of a portable wireless terminal to be turned over.

In order to accomplish this object, there is provided a rotary-type hinge module of a portable wireless terminal, which is disposed between a terminal body and a folder of the portable wireless terminal. The hinge module has a first rotation axis and a second rotation axis perpendicular to each other. The hinge module enables the folder to rotate about the second rotation axis after the folder is opened from the terminal body.

The hinge module comprises and is described as follows: A hinge housing is assembled with the terminal body while being rotatable about the first rotation axis. The hinge housing has a holing pin hole formed through one end thereof and a hinge shaft hole formed through the other end thereof in a direction of the first rotation axis. The hinge housing has a fixing seat and an opening, the fixing seat being formed at a portion of an inner surface thereof in a direction of the second rotation axis, and the opening being formed through an opposed portion to the fixing seat. The fixing seat is exposed through the opening in the direction of the second rotation axis. A supporting shaft is fixed to the fixing seat of the hinge housing and extends through the opening of the hinge housing. A hinge cam is fixed to the supporting shaft and has a valley-shaped portion formed at one side thereof. The valley-shaped portion has a curved surface. A hinge shaft having a mountain-shaped portion is formed at one side thereof and a hinge shaft hole is formed through both sides thereof. The mountain-shaped portion has a curved surface. The supporting shaft is inserted through the hinge shaft hole so that the hinge shaft is fitted around the supporting shaft in such a manner that the curved surface of the mountain-shaped portion is opposed to the curved surface of the valley-shaped portion. The hinge shaft has at least one guide protuberance formed on a circumferential surface of the hinge shaft. An elastic means forces the hinge shaft toward the hinge cam so that the curved surfaces of the mountain-shaped portion and the valley-shaped portion are in sliding contact with each other. A rotary shaft having a shape of a cylinder has an open end and a closed end opposite to each other. The rotary shaft contains the hinge cam, the hinge shaft, and the elastic means. The elastic means is supported by the closed end of the rotary shaft. The rotary shaft has a guide hole with which the guide protuberance of the hinge shaft is engaged, the rotary shaft having an assembling means to which one end of the folder is fixed.

In accordance with another aspect of the present invention, there is provided a rotary-type hinge module of a portable wireless terminal, for rotatably assembling a terminal body and a folder of the portable wireless terminal with each other. The hinge module comprises and is described as follows: A hinge housing is rotatably assembled with the terminal body. A supporting shaft is formed integrally with and extends outward from a portion of an inner surface of the hinge housing in a direction opposed to said portion. A first slip washer has a first washer hole formed longitudinally through a central portion thereof, by which the first slip washer is fixedly assembled with the supporting shaft. A second slip washer has a first washer hole formed longitudinally through a central portion thereof, by which the second slip washer is rotatably fitted around the supporting shaft while being in surface contact with the first slip washer. An elastic means is assembled with the supporting shaft and supports the second slip washer, so that the elastic means provides elastic force in a direction which forces the first and second slip washers to be in tighter contact with each other. A rotary shaft has a shape of a cylinder which has an open end and a closed end opposite to each other, the rotary shaft containing the first and second slip washers and the elastic means, which are assembled with the supporting shaft. The elastic means is supported by the closed end of the rotary shaft, the rotary shaft being assembled with the supporting shaft in such a manner that the rotary shaft can be rotated together with the second slip washer, thereby rotating the folder.

In accordance with still another aspect of the present invention, there is provided a rotary-type hinge module of a portable wireless terminal, for rotatably assembling a terminal body and a folder of the portable wireless terminal with each other. The hinge module comprises and is described as follows: A hinge housing is rotatably assembled with the terminal body. A supporting shaft is fixed to and extends outward from a portion of an inner surface of the hinge housing in a direction opposed to said portion. A leaf spring has a leaf spring hole formed through a central portion thereof, through which the supporting shaft is fitly inserted, so that the leaf spring is fixedly assembled with the supporting shaft. A first washer is fitted around the supporting shaft so that friction is generated between the first washer and the leaf spring when the leaf spring is rotated. A coil spring is assembled with the supporting shaft and supports the first washer, so that the coil spring provides elastic force in a direction which forces the first washer and the leaf spring in tighter contact with each other. A rotary shaft has a shape of a cylinder which has an open end and a closed end opposite to each other, the rotary shaft containing the leaf spring, the first washer, and the coil spring, which are assembled with the supporting shaft. The coil spring is supported by the closed end of the rotary shaft, the rotary shaft being assembled with the supporting shaft in such a manner that the rotary shaft can rotate the folder.

In accordance with still another aspect of the present invention, there is provided a rotary-type hinge system of a portable wireless terminal, for rotatably assembling a terminal body and a folder of the portable wireless terminal with each other. The hinge system comprises and is described as follows: a folder-opening hinge module provides a first rotation axis about which the folder can be rotated when the folder is opened or closed with respect to the terminal body. A rotary-type hinge module is rotatably assembled with the terminal body by the folder-opening hinge module. The rotary-type hinge module provides a second rotation axis perpendicular to the first rotation axis, the rotary-type hinge module being assembled with the folder, thereby enabling the folder to be rotated about the second rotation axis in a state where the folder is opened from the terminal body while being assembled with the terminal body.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, several preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
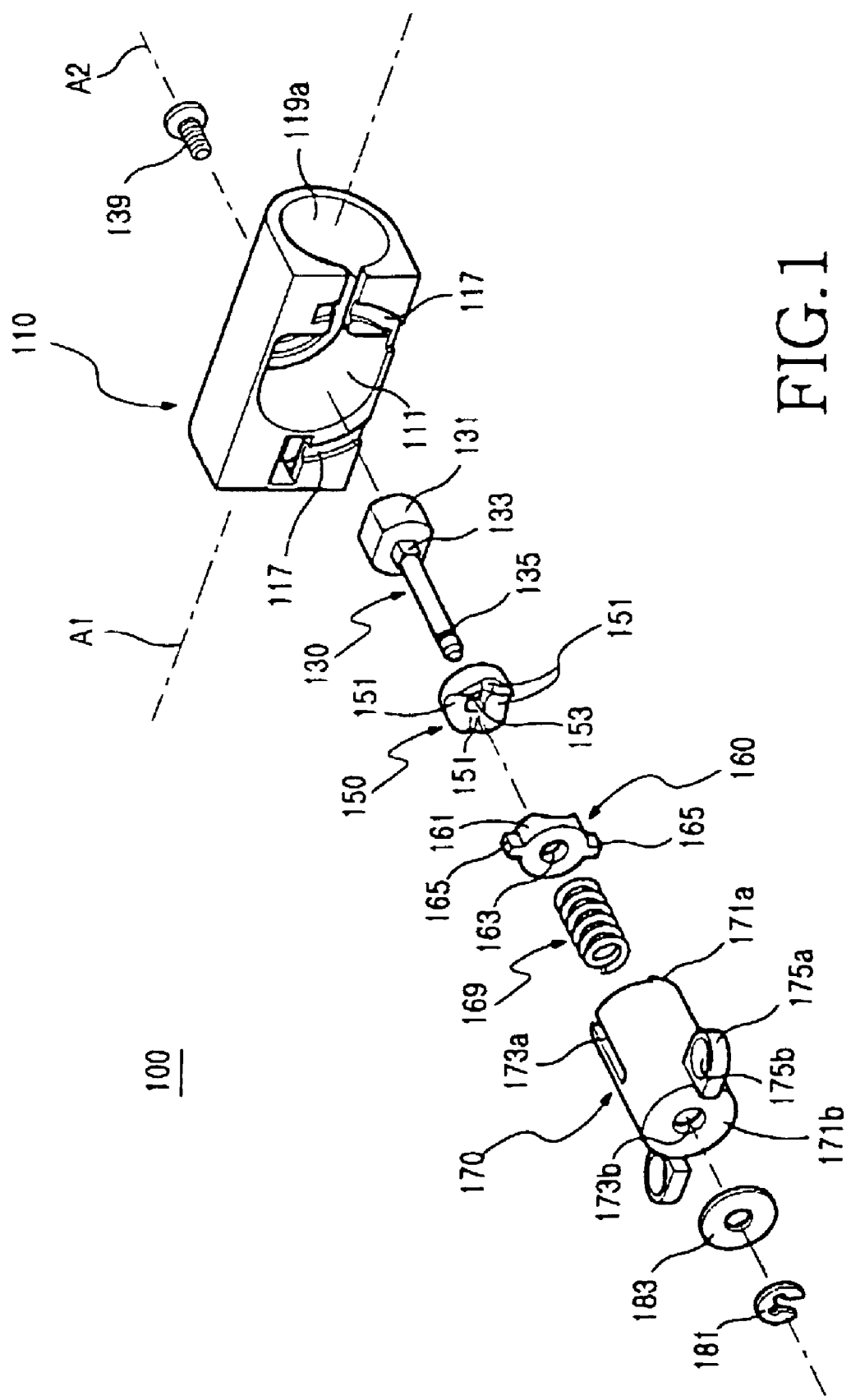
FIG. 1 is an exploded perspective view of a rotary-type hinge module of a portable wireless terminal according to a first preferred embodiment of the present invention.
Figure 2:
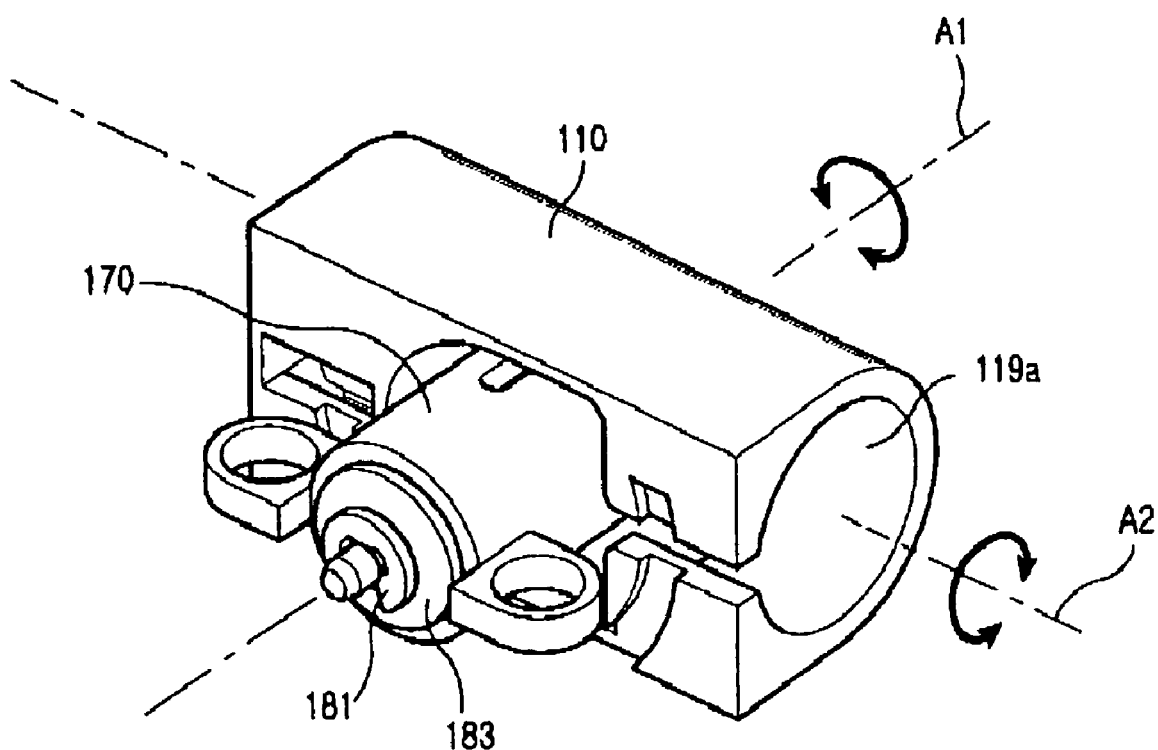
FIG. 2 is a perspective view of the rotary-type hinge module shown in FIG. 1.

FIG. 1 is an exploded perspective view of a rotary-type hinge module 100 of a portable wireless terminal according to a first preferred embodiment of the present invention, and FIG. 2 is a perspective view of the rotary-type hinge module 100 shown in FIG. 1. As shown in FIGS. 1 and 2, the rotary-type hinge module 100 according to the first preferred embodiment of the present invention includes a hinge housing 110, a supporting shaft 130, a rotary shaft 170, a hinge cam 150, a hinge shaft 160, and an elastic means 169 (such as a spring). The hinge cam 150, the hinge shaft 160, and the elastic means 169 are assembled with the supporting shaft 130 and received in the rotary shaft 170.

Figure 3:
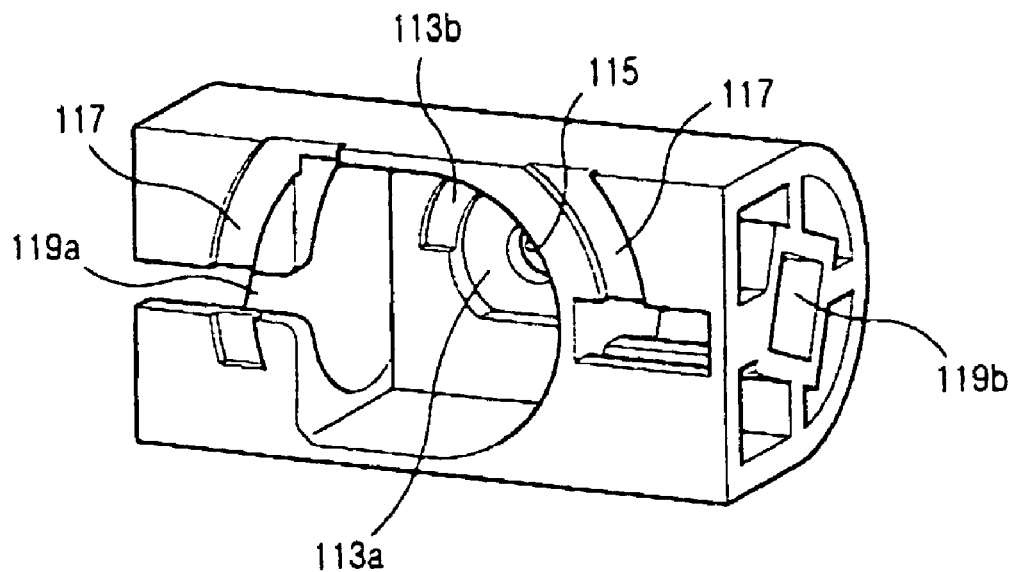
FIG. 3 is a perspective view of a hinge housing employed in the rotary-type hinge module shown in FIG. 1.

Referring to FIGS. 1 to 3, a holding pin hole 119a is formed through one end of the hinge housing 110, and a hinge shaft hole 119b (see FIG. 3) is formed through the other end of the hinge housing 110. A portion of an inner surface of the hinge housing 110 is concave to form a fixing seat 113a on which the supporting shaft 130 is assembled. In this case, it is preferred that the fixing seat 113a has a shape other than a circular shape, so as to prevent the supporting shaft 130 (which has a matching contour to the fixing seat 113a) from rotating after being assembled on the fixing seat 113a of the hinge housing 110, and to enable the supporting shaft 130 to be securely assembled with the hinge housing 110. A fixing hole 115 is formed through a central portion of the fixing seat 113a to interconnect inner and outer sides of the hinge housing 110, so that the supporting shaft 130 can be assembled on the fixing seat 113a of the hinge housing 110 by a screw 139 screwed through the fixing hole 115 and into the end face of supporting shaft 131.

The hinge housing 110 also has an opening 111 formed through a wall opposed to the surface on which the fixing seat 113a is formed. The opening 111 provides a space, through which the supporting shaft 130 fixed on the fixing seat 113a protrudes out of the hinge housing 110, and in which the rotary shaft 170 is partially received when assembled. A sliding surface 113b is partially formed around the fixing seat 113a and has a shallower depth in inner surface of hinge housing 110 than fixing seat 113a, thereby forcing a step. The sliding surface 113b is formed along a trace corresponding to the rotating trace of the rotary shaft 170 and rotation protuberance 177 of rotary shaft 170 is received therein. Consequently, sliding surface 113b limits an angular range, within which the rotary shaft 170 can rotate, to 180°, that is, the angular expanse of sliding surface 113b. Additionally, a sliding groove 117 is formed in a semicircular shape around the opening 111, and functions similarly to the sliding surface 113b formed around the fixing seat 113a. In other words, protuberances formed at a lower end of a folder of a portable wireless terminal are inserted in and moved along the sliding groove 117, which will be described in more detail with reference to FIG. 6. In conclusion, the sliding surface 113b and the sliding groove 117 enable the folder of the portable wireless terminal to be rotated within the angular range of 180°.

The hinge housing 110 having the construction described above is rotatably assembled with a housing of a terminal body by means of the holding pin hole 119a and the hinge shaft hole 119b, so as to provide a first rotation axis A1 about which the folder is rotated when it is opened or closed.

A fixed head 131 having a shape corresponding to that of the fixing seat 113a of the hinge housing 110 is formed at one end of the supporting shaft 130, and a stepped portion 133 having an angular shape is formed circumferentially around and radially outward from the supporting shaft 130 and has a predetermined length from the fixed head 131 in a longitudinal direction along the supporting shaft 130. Further, an annular groove 135 is formed circumferentially on an outer cylindrical surface of the other end of the supporting shaft 130. The supporting shaft 130 is fixed by the screw 139 screwed through the fixing hole 115 of the hinge housing 110 as described above and provides a means with which the rotary shaft 170 together with elements contained in the rotary shaft 170 can be assembled. That is, the supporting shaft 130 provides a second rotation axis A2, about which the rotary shaft 170 is rotated, and which is perpendicular to the first axis A1.

Figure 4:
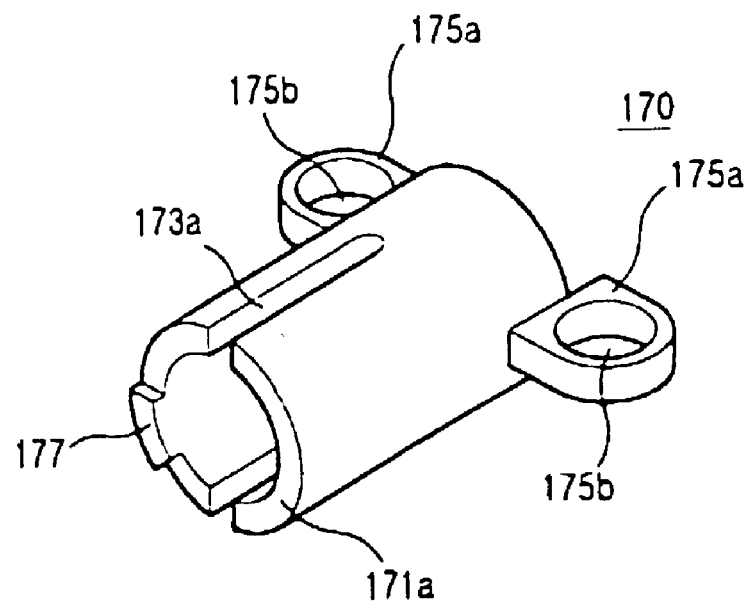
FIG. 4 is a perspective view of a rotary shaft employed in the rotary-type hinge module shown in FIG. 1.

The rotary shaft 170 (also shown in FIG. 4) has a cylindrical shape in which a predetermined receiving space is formed, and one end of the rotary shaft 170 is an open end 171a while the other end of the rotary shaft 170 is a closed end 171b through which a shaft hole 173b is formed. The rotary shaft 170 has guide holes 173a extending longitudinally from the open end 171a, each of which extends radially through the rotary shaft 170 to connect the interior and exterior of the rotary shaft 170. Also, the rotary shaft 170 has a rotation protuberance 177 extending a predetermined length in the longitudinal direction from the open end 171a as shown in FIG. 4. Two ribs 175a are provided at the closed end 171b of the rotary shaft 170 and extend laterally outward from a cylindrical outer surface of the closed end 171b. An assembling hole 175b is formed through each of the ribs 175a, so as to serve as a means for assembling the rotary-type hinge module 100 with the folder of the wireless terminal. The rotary shaft 170 is assembled with the supporting shaft 130 fixed to the hinge housing 110. When they are assembled, the supporting shaft 130 is inserted through and out of the shaft hole 173b of the closed end 171b so that the annular groove 135 of the supporting shaft 130 is exposed, and an E-ring 181 is fitted in and around the annular groove 135. In this case, a washer 183 is fitted between the E-ring 181 and the closed end 171b.

The hinge cam 150, the hinge shaft 160, and the elastic means 169, which are assembled with the supporting shaft 130, are received in the rotary shaft 170.

The hinge cam 150 has a hinge cam hole 153 formed longitudinally through a central portion of the hinge cam 150. The hinge cam hole 153 has a shape corresponding to the shape of the stepped portion 133, so that the stepped portion 133 is snugly received in the hinge cam hole 153 to enable the hinge cam 150 to be fixedly assembled with the supporting shaft 130. Further, the hinge cam 150 has at least one valley-shaped portion 151 formed at one end of the hinge cam 150 and having a concavely curved surface.

The hinge shaft 160 has a hinge shaft hole 163 formed longitudinally through a central portion of the hinge shaft 160, which enables the hinge shaft 160 to be rotatably assembled with the supporting shaft 130. The hinge shaft 160 has a mountain-shaped (convex) portion 161 corresponding to the valley-shaped (concave) portion 151 of the hinge cam 150. The valley-shaped portion 151 and the mountain-shaped portion 161 are in sliding contact with each other. Guide protuberances 165 corresponding to the guide holes 173a of the rotary shaft 170 are formed on a circumferential surface of the hinge shaft 160, so as to allow the hinge shaft 160 to be moved linearly in the rotary shaft 170 along the axis A2. Further, since the guide protuberances 165 and the guide holes 173a are engaged with each other, when the rotary shaft 170 is rotated, the hinge shaft 160 is also rotated.

One end of the elastic means 169 is supported by an inner surface of the closed end 171b of the rotary shaft 170, so as to apply an elastic force to the hinge shaft 160 in a direction to press the mountain-shaped portion 161 and the valley-shaped portion 151 to be in tighter contact with each other. Thus when a highest portion of the mountain-shaped portion 161 and a lowest portion of the valley-shaped portion 151 are in contact with each other, the hinge shaft 160 is not rotated but is stopped. Further, when the highest portion of the mountain-shaped portion 161 and the lowest portion of the valley-shaped portion 151 are not in contact with each other, the elastic force of the elastic means 169 creates a force such that the hinge shaft 160 moves linearly toward the hinge cam 150 while being rotated in a direction in which the highest portion of the mountain-shaped portion 161 and the lowest portion of the valley-shaped portion 151 come closer to each other until they come to be in contact with each other. When the hinge shaft 160 is rotated more than a predetermined angle from its initial position, it reaches a location at which the highest portion of the valley-shaped portion 151 and the lowest portion of the mountain-shaped portion 161 are in contact with each other. At this point the elastic force provided by the elastic means 169 is offset by the force between the valley-shaped portion 151 and the mountain-shaped portion 161, and may continue to be rotated with little or no further force provided. In the case where only one valley-shaped portion 151 and only one mountain-shaped portion 161 extends in parallel to a diameter of the hinge cam 150 or the hinge shaft 160, the rotation of the hinge shaft 160 is stopped when the hinge shaft 160 has been rotated 180° from its initial position, namely, when the highest portion of mountain-shaped portion 161 is again received by lowest portion of valley-shaped portion 151. Further, in this case, when the hinge shaft 160 is rotated more than 90°, the hinge shaft 160 continues to be rotated up to 180° and then is stopped due to the curved surfaces of the hinge cam 150 and the hinge shaft 160 even though no more force is applied.

Meanwhile, locations at which the hinge shaft 160 is stopped may be variously determined by properly selecting shapes of the valley-shaped portion 151 and the mountain-shaped portion 161. For example, in the case as shown in FIG. 1 where two valley-shaped portions 151 extending in diametric directions and intersecting perpendicularly with each other, when the hinge shaft 160 is rotated more than 45°, the hinge shaft 160 continues its rotation and the rotation of the hinge shaft 160 is stopped when the hinge shaft 160 has been rotated 90° from its initial position, even though no more force is applied. Also, when the hinge shaft 160 is further rotated more than 45° from the position at which the hinge shaft 160 has been already rotated 90°, the hinge shaft 160 continues its rotation and the rotation of the hinge shaft 160 is stopped when the hinge shaft 160 has been rotated 180° from its initial position, even though no more force is applied. That is to say, whenever the highest portion of the mountain-shaped portion 161 engages with the lowest portion of the valley-shaped portions 151, the rotation of the hinge shaft 160 is stopped.

In the rotary-type hinge module 100 having the construction described above, the folder is opened or closed when the hinge housing 110 is rotated with respect to the terminal body about axis A1, and the opened folder may also be rotated within the angular range of 180° through the rotation of the rotary shaft 170 about axis A2.

Figure 5:
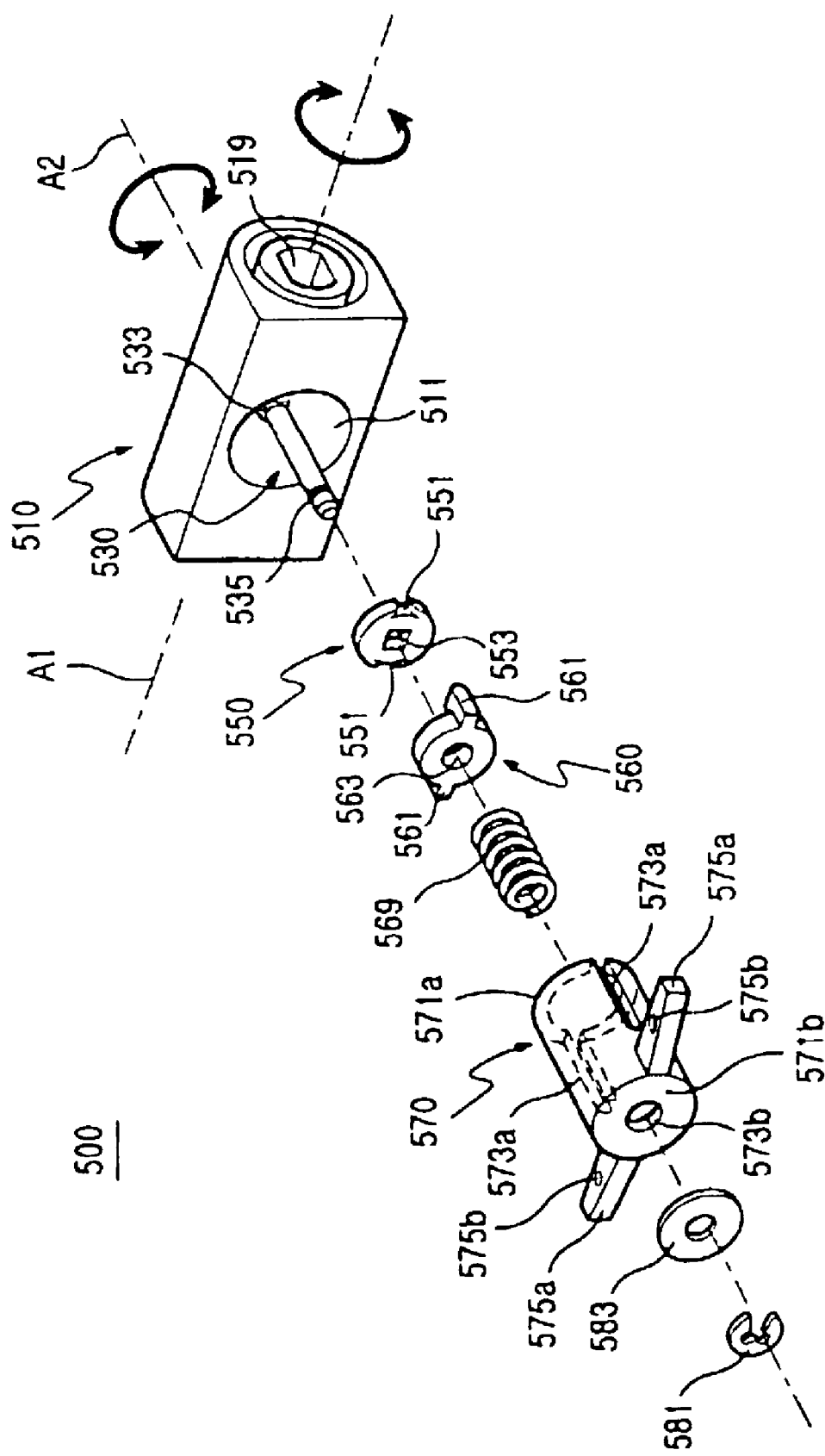
FIG. 5 is an exploded perspective view of a rotary-type hinge module of a portable wireless terminal according to a second preferred embodiment of the present invention.

FIG. 5 is an exploded perspective view of a rotary-type hinge module 500 of a portable wireless terminal according to a second preferred embodiment of the present invention. As shown in FIG. 5, the rotary-type hinge module 500 according to the second preferred embodiment of the present invention includes a hinge housing 510, a supporting shaft 530, a rotary shaft 570, a first slip washer 550, a second slip washer 560, and an elastic means 569. The first slip washer 550, the second slip washer 560, and the elastic means 569 are assembled with the supporting shaft 530 and received in the rotary shaft 570.

A holding pin hole (not shown) is formed through one end of the hinge housing 510, and hinge shaft hole 519 is formed through the other end of the hinge housing 510. The supporting shaft 530 is formed integrally with and extends outward from a portion of an inner surface of the hinge housing 510. The supporting shaft 530 extends out of the hinge housing 510 through an opening 511 which is formed through a wall of the hinge housing 510 opposed to the portion from which the supporting shaft 530 extends. The opening 511 provides a space, through which the supporting shaft 530 can protrude out of the hinge housing 510, and in which the rotary shaft 570 can be located when it is assembled. The hinge housing 510 having the construction described above is rotatably assembled with a housing of a terminal body by means of the holding pin hole and a hinge shaft hole 519, so that the hinge housing 510 is rotated with respect to the terminal body about axis A1 according to the opening or closing operation of the folder of the wireless terminal. The rotary-type hinge module 500 according to the second embodiment of the present invention has a construction capable of being rotated 360°, different from that of the rotary-type hinge module 100 according to the first embodiment of the present invention.

The supporting shaft 530 is formed integrally with a portion of the inner surface of the hinge housing 510, and a stepped portion 533 having an angular shape is formed around and radially outward from the supporting shaft 530 and has a predetermined width from the portion with which the supporting shaft 530 is integrated. Further, an annular groove 535 is formed circumferentially on an outer cylindrical surface of the end of the supporting shaft 530. The supporting shaft 530 provides a means with which the rotary shaft 570 together with elements received in the rotary shaft 570 is assembled.

The rotary shaft 570 has a cylindrical shape in which a predetermined receiving space is formed, and one end of the rotary shaft 570 is an open end 571a while the other end of the rotary shaft 570 is a closed end 571b through which a shaft hole 573b is formed. The rotary shaft 570 has guide holes 573a extending longitudinally from the open end 571a, each of which extends radially through the side wall of the rotary shaft 570. Two ribs 575a are provided at the closed end 571b of the rotary shaft 570 and extend laterally outward from a cylindrical outer surface of the closed end 571b. An assembling hole 575b is formed through each of the ribs 575a, so as to provide a means for assembling the rotary-type hinge module 500 with the folder of the wireless terminal. The rotary shaft 570 is assembled with the supporting shaft 530 fixed to the hinge housing 510. When they are assembled, the supporting shaft 530 is inserted through and out of the shaft hole 573b of the closed end 571b so that the annular groove 535 of the supporting shaft 530 is exposed, and an E-ring 581 is fitted in and around the annular groove 535. In this case, a washer 583 is fitted between the E-ring 581 and the closed end 571b.

The first slip washer 550, the second slip washer 560, and the elastic means 569, which are assembled with the supporting shaft 530, are received in the rotary shaft 570.

The first slip washer 550 has a first washer hole 553 formed longitudinally through a central portion of the first slip washer 550. The first washer hole 553 has a shape corresponding to the shape of the stepped portion 533 of the supporting shaft 530, so that the stepped portion 533 inserts snugly in the first washer hole 553 to enable the first slip washer 550 to be fixedly assembled with the supporting shaft 530. Further, the first slip washer 550 has the washer grooves 551 formed on outer circumferential surface of the first slip washer 550.

The second slip washer 560 has a second washer hole 563 formed longitudinally through a central portion of the second slip washer 560, which enables the second slip washer 560 to be rotatably assembled with the supporting shaft 530. Guide protuberances 561 corresponding to the guide holes 573a of the rotary shaft 570 are formed on a circumferential surface of the second slip washer 560, so as to allow the second slip washer 560 to be moved linearly in the rotary shaft 570. Further, since the guide protuberances 561 and the guide holes 573a are engaged with each other, when the rotary shaft 570 is rotated, the second slip washer 560 is also rotated. The guide protuberances 561 protrude beyond a surface of the second slip washer 560, which is opposed to the first slip washer 550, and engages with the washer grooves 551 of the first slip washer 550.

The washer grooves 551 of the first slip washer 550 and the guide protuberances 561 of the second slip washer 560 have a latch function which fixes relative positions between them, or the positions of the folder, when they are engaged with each other. In this case, it is preferred that the engaged portions of the washer grooves 551 and the guide protuberances 561 are chamfered to have curved surfaces so that they can be easily separated from each other when a certain degree of rotational force is applied between them in opposite directions about axis A2.

One end of the elastic means 569 is supported by an inner surface of the closed end 571b of the rotary shaft 570, so as to apply an elastic force to the second slip washer 560 in a direction in which the first slip washer 550 and the second slip washer 560 are forced to be in more tight contact with each other. Therefore, when the washer grooves 551 of the first slip washer 550 and the guide protuberances 561 of the second slip washer 560 are engaged with each other, the second slip washer 560 does not freely rotate. When a user applies a certain degree of rotational force, the guide protuberances 561 are separated from the washer grooves 551 and slide along a circumferential edge of a surface of the first slip washer 550, which is opposed to the second slip washer 560. At this time, the second slip washer 560 is pushed back toward the elastic means 569, so that elastic force is accumulated in the elastic means 569. When the second slip washer 560 is continuously rotated and located at a position where the washer grooves 551 and the guide protuberances 561 are again aligned with each other, the elastic force from the elastic means 569 makes the washer grooves 551 and the guide protuberances 561 engage each other again.

In the rotary-type hinge module 500 having the construction described above, the folder is opened or closed when the hinge housing 510 is rotated with respect to the terminal body about axis A1, and the opened folder is rotated through the rotation of the rotary shaft 570 about axis A2.

As described above in detail, while the rotary-type hinge module according to the first embodiment of the present invention has a construction, which can be automatically rotated to a predetermined angle when it is rotated more than another predetermined angle, the rotary-type hinge module according to the second embodiment of the present invention has not only a construction, which enables a user to stop the rotation of the construction at a desired position, but also a latch construction which enables the module to be kept in a stable state at a predetermined angle when necessary.

Meanwhile, the first rotation axis A1 shown in FIGS. 1 to 3 is a rotation axis of the hinge housing 110 or 510, which is a rotation axis of the folder with respect to the terminal body when the folder is opened or closed. Further, the second rotation axis A2 is a rotation axis of the rotary shaft 170 or 570, another rotation axis of the folder, about which the opened folder is rotated in order to alternately expose the front and rear surfaces of the folder.

Hereinafter, an example in which the rotary-type hinge module 100 according to the first embodiment of the present invention is employed in a wireless terminal will be described with reference to FIGS. 6 to 8. It is apparent that those related in the art can easily realize a wireless terminal employing the rotary-type hinge module 500 according to the second embodiment of the present invention, with reference to the example of the wireless terminal employing the rotary-type hinge module 100.

Figure 6:
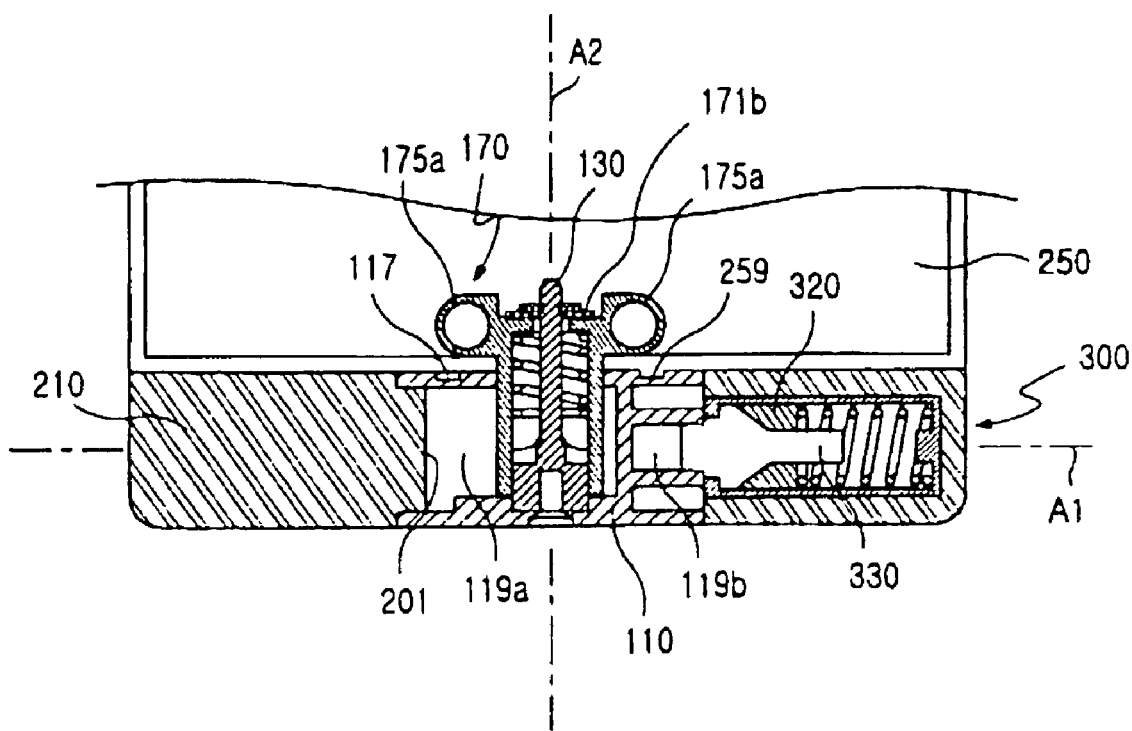
FIG. 6 is a sectional view of a portion of a wireless terminal employing the rotary-type hinge module shown in FIG. 1.

FIG. 6 is a sectional view of a portion of a wireless terminal employing the rotary-type hinge module 100 shown in FIG. 1. As shown in FIG. 6, in the rotary-type hinge module 100 according to the first embodiment of the present invention, a holding pin 201 of a terminal body 210 is inserted in the holding pin hole 119a of the hinge housing 110, and a folder-opening hinge module 300 received in the terminal body 210 is inserted in the hinge shaft hole 119b of the hinge housing 110, so that hinge housing 110 is rotatable with respect to the terminal body 210 about axis A1. Meanwhile, the ribs 175a provided at the closed end 171b of the rotary shaft 170 of the rotary-type hinge module 100 are assembled with a folder 250. As a result, the folder 250 is opened or closed when the folder 250 together with the rotary-type hinge module 100 are rotated with respect to the terminal body 210, and the folder 250 in an opened state can also be rotated about the supporting shaft 130 of the hinge module i.e., about axis A2.

In this case, a sliding protuberance 259 provided at the lower end of the folder 250 is located in the sliding groove 117 of the hinge housing 110, and is guided along the sliding groove 117 when the folder 250 in the opened state is rotated. Attention should be paid to ensuring that the sliding protuberance 259, which is provided at the lower end of the folder 250 in the present example, should be eliminated in a folder of the wireless terminal employing the rotary-type hinge module 500 according to the second embodiment of the present invention.

Figure 7:
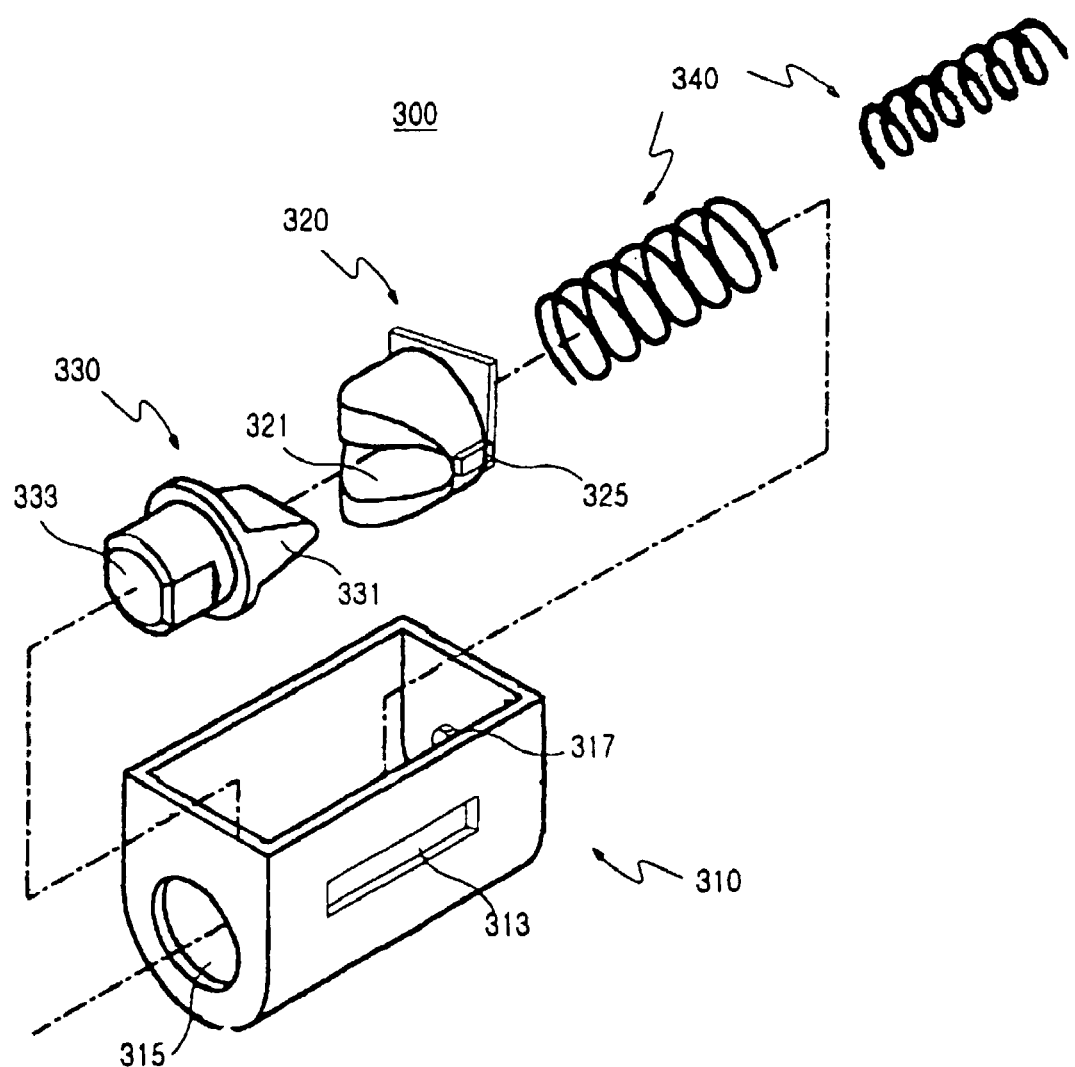
FIG. 7 is an exploded perspective view of the folder-opening hinge module shown in FIG. 6.

FIG. 7 is an exploded perspective view of the folder-opening hinge module 300 shown in FIG. 6. The folder-opening hinge module 300 shown in FIG. 7 includes a module housing 310 having an elastic means 340, a hinge cam 320, and a hinge shaft 330. The elastic means 340, the hinge cam 320, and the hinge shaft 330 are received in sequence in the interior of module housing 310.

The hinge cam 320 linearly moves in the module housing 310 when guide protuberance 325 formed on outer side surface of the hinge cam 320 is guided along guide groove 313 formed on side surfaces of the module housing 310.

The hinge shaft 330 has a shaft portion 333 which is inserted through and out of a hinge shaft hole 315 of the module housing 310 and is fitted in the hinge shaft hole 119*b* of the rotary-type hinge module 100.

The hinge cam 320 and the hinge shaft 330 respectively have a valley-shaped portion 321 and a mountain-shaped portion 331 each having a curved shape. The elastic means 340 applies elastic force to the hinge cam 320 in a direction of forcing the valley-shaped portion 321 and the mountain-shaped portion 331 to contact with each other. Therefore, when the valley-shaped portion 321 and the mountain-shaped portion 331 are rotated such that they are not entirely in complete contact with each other, the hinge cam 320 is moved toward the hinge shaft 330 by the elastic force of the elastic means 340 while being rotated due to the curved construction of the valley-shaped portion 321 and the mountain-shaped portion 331. When the hinge shaft 330 connected with the rotary-type hinge module 100 is rotated, the hinge cam 320 is moved back and elastic force is accumulated in the elastic means 340. After the hinge shaft 330 is further rotated and the highest and lowest portions of the valley-shaped portion 321 and the mountain-shaped portion 331 intersect perpendicularly with each other, the elastic force of the elastic means 340 makes the hinge cam 320 press the hinge shaft 330 to thereby rotate the hinge shaft 330. At the position where the highest and lowest portions of the valley-shaped portion 321 and the mountain-shaped portion 331 are completely in contact with each other, the rotation of the hinge shaft 330 stops.

The folder-opening hinge module 300 further includes a holding protuberance 317 for limiting the position of and supporting the elastic means 340, which is formed on an inner surface of the module housing 310. Further, the elastic means 340 of the folder-opening hinge module 300 may comprise two springs of different dimensions as shown in FIG. 7, when it is necessary, that is, a large-diameter spring and a small-diameter spring inserted in the large-diameter spring.

Figure 8:
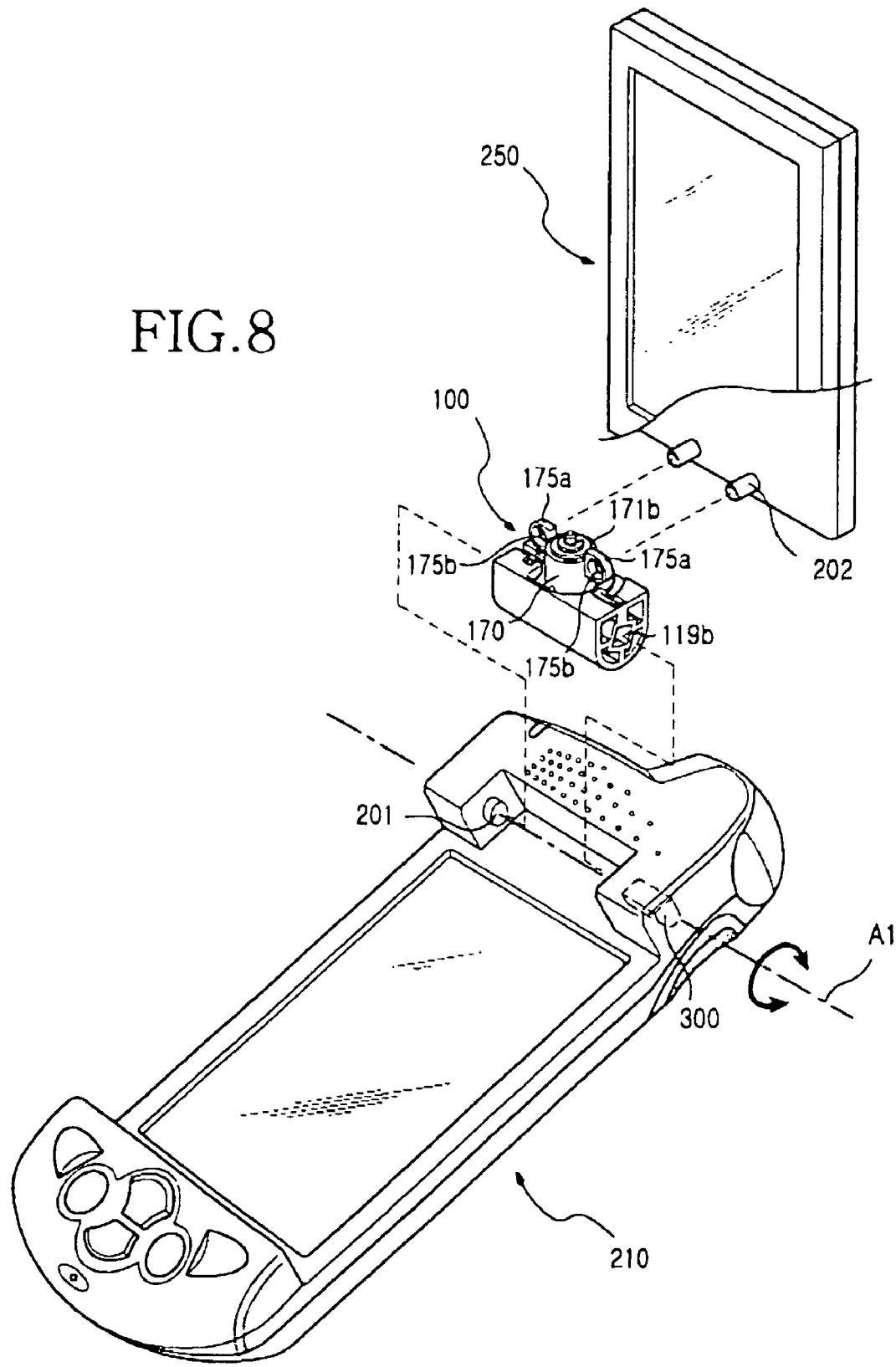
FIG. 8 is an exploded perspective view of a portable wireless terminal, which shows the construction for assembling the rotary-type hinge module shown in FIG. 1 with the wireless terminal.

FIG. 8 is an exploded perspective view of a portable wireless terminal, which shows the construction for assembling the rotary-type hinge module 100 shown in FIG. 1 with the wireless terminal. As shown in FIG. 8, the holding pin 201 provided at the housing of the terminal body 210 is inserted in and assembled with the holding pin hole 119*a* of the rotary-type hinge module 100, and the folder-opening hinge module 300 (see FIG. 6) contained in the housing of the terminal body 210 is inserted in and assembled with the hinge shaft hole 119*b* of the rotary-type hinge module 100, so that the rotary-type hinge module 100 is assembled with the terminal body 210 while being rotatable with respect to the terminal body 210, more specifically, to the first rotation axis A1.

The rotary shaft 170 of the rotary-type hinge module 100 is received in the folder 250 of the wireless terminal. Specifically, the ribs 175*a* provided at the closed end 171*b* of the rotary shaft 170 are assembled with assembling protuberances 202 formed on the folder 250 and having the assembling holes 175*b*. According to other embodiments, assembling means such as screws may be employed instead of the assembling holes 175*b* and the assembling protuberances 202.

Figure 9:
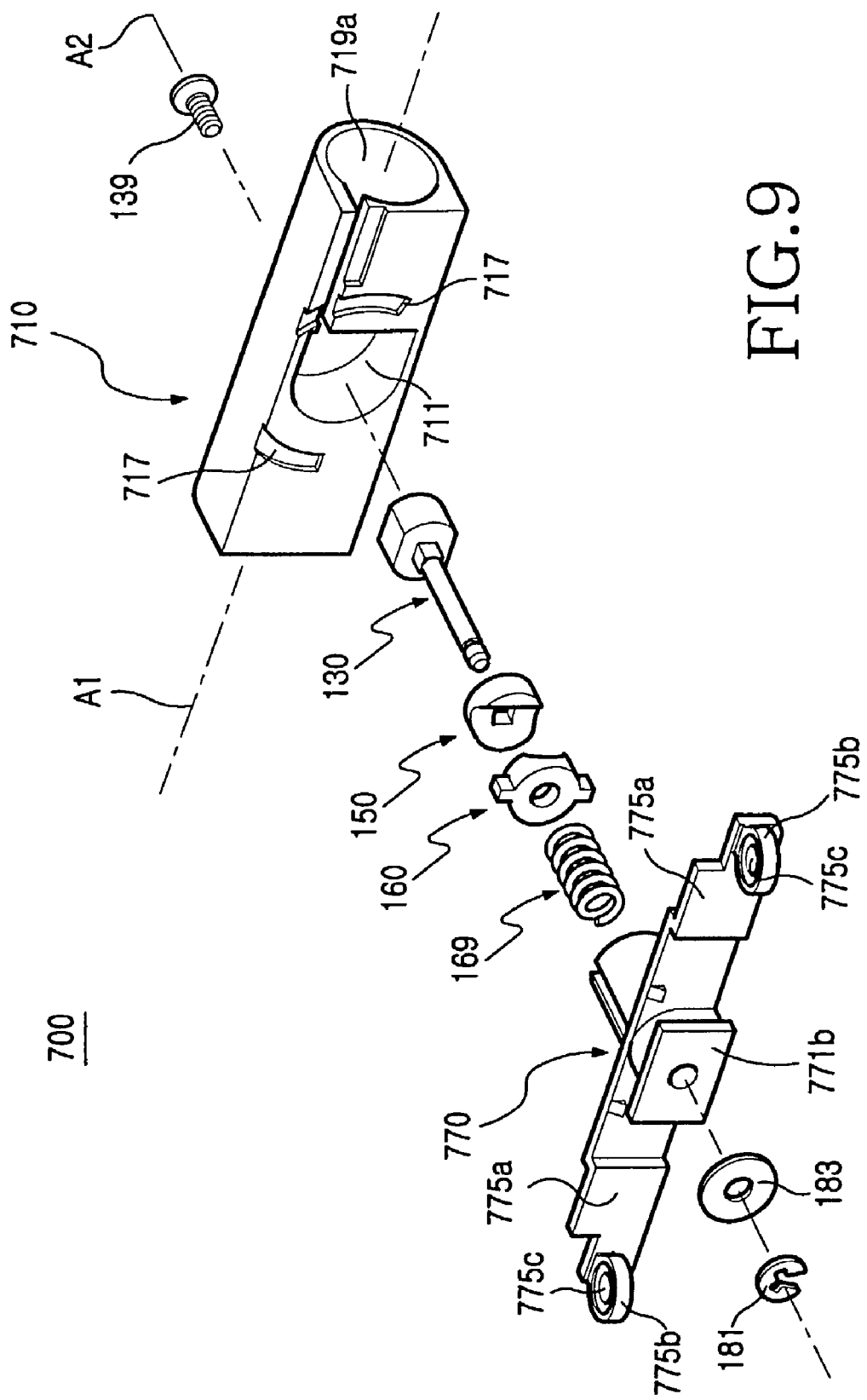
FIG. 9 is an exploded perspective view of a rotary-type hinge module of a portable wireless terminal according to a third preferred embodiment of the present invention.
Figure 10:
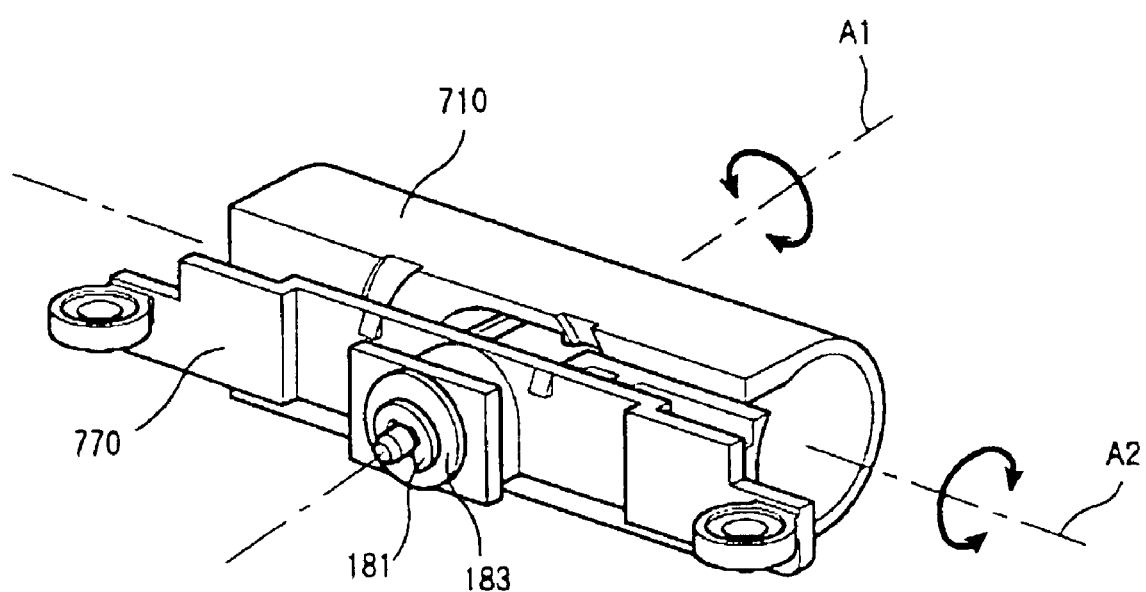
FIG. 10 is a perspective view of the rotary-type hinge module shown in FIG. 9.

FIG. 9 is an exploded perspective view of a rotary-type hinge module 700 of a portable wireless terminal according to a third preferred embodiment of the present invention, and FIG. 10 is a perspective view of the rotary-type hinge module 700 shown in FIG. 9. The rotary-type hinge module 700 according to the third preferred embodiment of the present invention includes the same elements as those in the first embodiment, except for a hinge housing 710 and a rotary shaft 770. Therefore, the description about the third embodiment of the present invention will be given in relation to only the hinge housing 710 and the rotary shaft 770.

Figure 11:
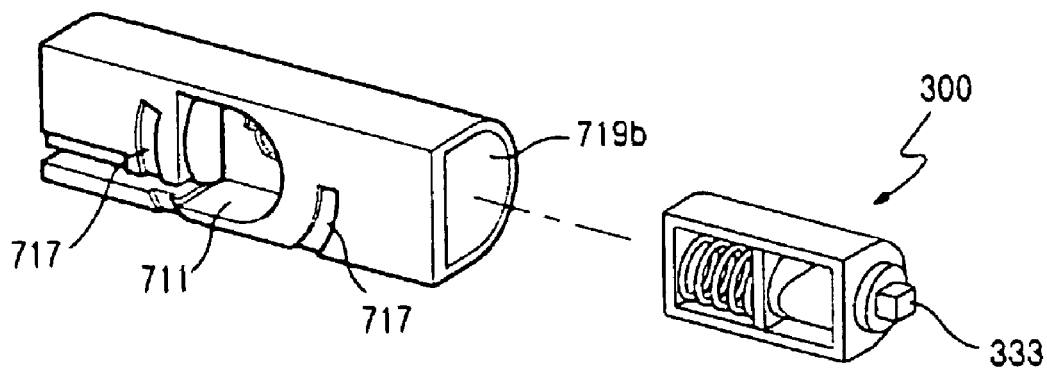
FIG. 11 is a perspective view of the hinge housing employed in the rotary-type hinge module shown in FIG. 9.

FIG. 11 is a perspective view of the hinge housing 710 employed in the rotary-type hinge module 700 shown in FIG. 9. As apparent from in FIGS. 9 and 11, the hinge housing 710 is different from the hinge housing 110 according to the first embodiment, in that a receiving hole 719*b* for receiving the folder-opening hinge module 300 shown in FIG. 7 is formed at one end of the hinge housing 710. That is to say, while the folder-opening hinge module 300 is received in the terminal body 210 of wireless terminal in the first embodiment of the present invention, the rotary-type hinge module 700 according to the third embodiment of the present invention has a construction capable of receiving the folder-opening hinge module 300.

When the hinge module 300 is received in the receiving hole 719*b* of the hinge housing 710 of the rotary-type hinge module 700, the shaft portion 333 of the folder-opening hinge module 300 protrudes out of the hinge housing 710. A hinge shaft hole (not shown) corresponding to the shaft portion 333 is formed at the terminal body 210.

Figure 12:
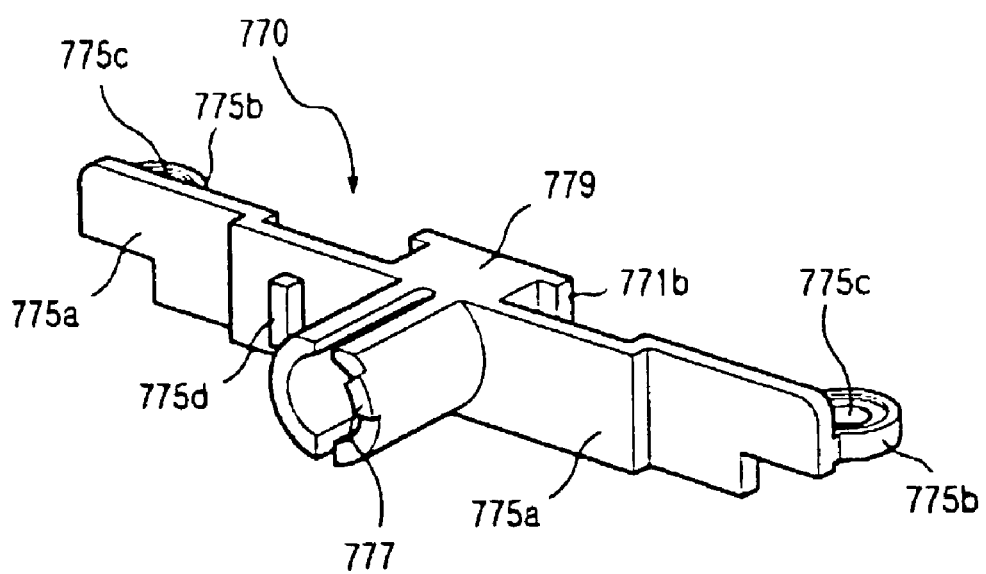
FIG. 12 is a perspective view of the rotary shaft employed in the rotary-type hinge module shown in FIG. 9.

FIG. 12 is a perspective view of the rotary shaft 770 of the rotary-type hinge module 700 shown in FIG. 9. As shown in FIGS. 9 and 12, the rotary shaft 770 according to the third embodiment of the present invention is different from the rotary shaft 170 according to the first embodiment of the present invention, in that assembling wings 775*a* which form a means for assembling the rotary shaft 770 with the folder are formed at opposite sides of a closed end 771*b* of the rotary shaft 770, and a predetermined flat surface 779 is formed at one side of the closed end 771*b* of the rotary shaft 770.

The assembling wings 775*a* and the flat surface 779 prevent load by the rotational force of the folder from being concentrated to a specific portion of the folder housing or the rotary shaft 770 when the folder of the wireless terminal is rotated about axis A2, thereby preventing the rotary-type hinge module 700 or the folder housing from being broken.

The assembling wings 775*a* extend laterally outward from opposite sides of the closed end 771*b* of the rotary shaft 770. Both surfaces of each of the assembling wings 775*a* are oriented in the longitudinal direction of the rotary shaft 770, so that they can endure better the load due to the rotational force. The assembling wings 775*a* extend longer than the hinge housing 710, and preferably extend as long as possible to be similar to the width of the folder of the portable wireless terminal. This is because, the longer the assembling wings 775*a* are, the better the load from rotation is distributed. The ribs 775*b* extend in the longitudinal direction of the rotary shaft 770 from end portions of the assembling wings 775*a*. Assembling holes 775*c* assembled with the folder of the wireless terminal are formed each through each of the ribs 775*b*. The ribs 775*b* are disposed inside of the folder and assembled with the folder by means of screws, and so on.

Also, a stopper 775*d* is formed on a surface of the assembling wings 775*a*, which is opposed to the hinge housing 710, and a sliding groove 717 corresponding to a rotation trace of the stopper 775d is formed on the hinge housing 710. The sliding groove 717 causes the range within which the stopper 775d can be rotated to be limited to 180°.

Figure 13:
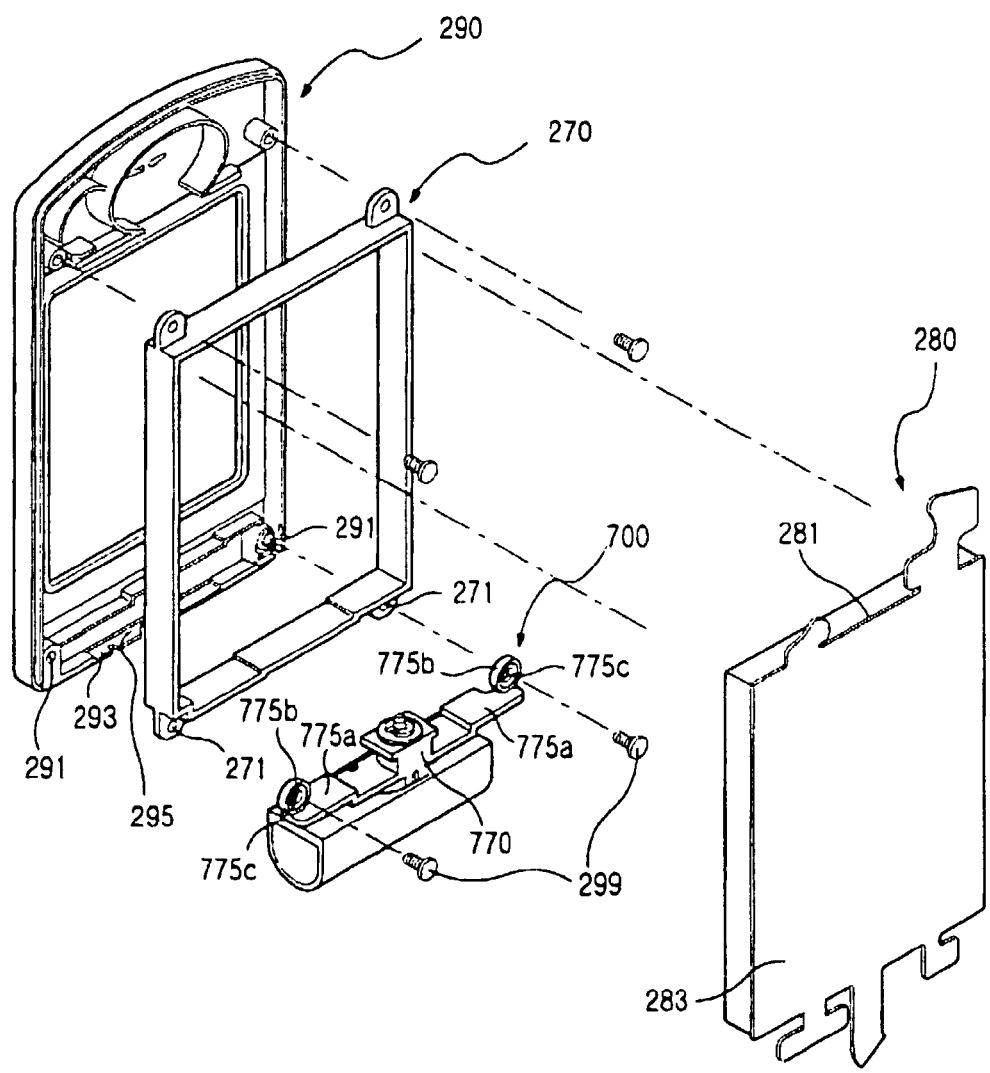
FIG. 13 is an exploded perspective view of a folder housing with which the rotary-type hinge module shown in FIG. 9 is assembled.

FIG. 13 is an exploded perspective view of a folder housing 290 with which the rotary-type hinge module 700 shown in FIG. 9 is assembled. It is preferred to utilize a predetermined frame 270 in order to assemble the rotary-type hinge module 700 with the folder housing 290. The frame 270 may be manufactured integrally with the rotary shaft 770 of the rotary-type hinge module 700.

While the folder 250 is being opened or closed with respect to the terminal body, the frame 270 prevents the moment of rotational force of the folder from being concentrated on the ribs 775b and assembling holes 291 of the folder housing 290, thereby preventing the ribs 775b or the folder housing 290 from being damaged. With the frame 270 in place, the frame 270 directly transmits the rotational force of the folder 250 generated by a user to the axis of the folder-opening hinge module 300, that is, to axis A1. Further, a circuit section 280 received in the folder housing 290 can be received in the frame 270, so that a separate means for fixing the circuit section 280 to the folder housing 290 is unnecessary. The circuit section 280 includes a display 281, which is usually a liquid crystal display (LCD), a flexible printed circuit board 283, and so on.

Meanwhile, assembling holes 291 corresponding to the assembling holes 775c of the rib 775b are formed at side portions of the lower end of the inner surface of the folder housing 290, so that the rotary-type hinge module 700 can be assembled with the folder housing 290 by means of screws 299 screwed through the assembling holes 775c into the assembling holes 291. Also, the folder housing 290 may further have a recess 295 in which the rotary shaft 770 and the assembling wings 775a of the rotary-type hinge module 700 are received by means of a rib 293.

The screws 299 may be screwed not only through the ribs 775b of the rotary-type hinge module 700 but also through assembling holes 271 formed at the frame 270 into the assembling holes 291 of the folder housing 290.

Figure 14:
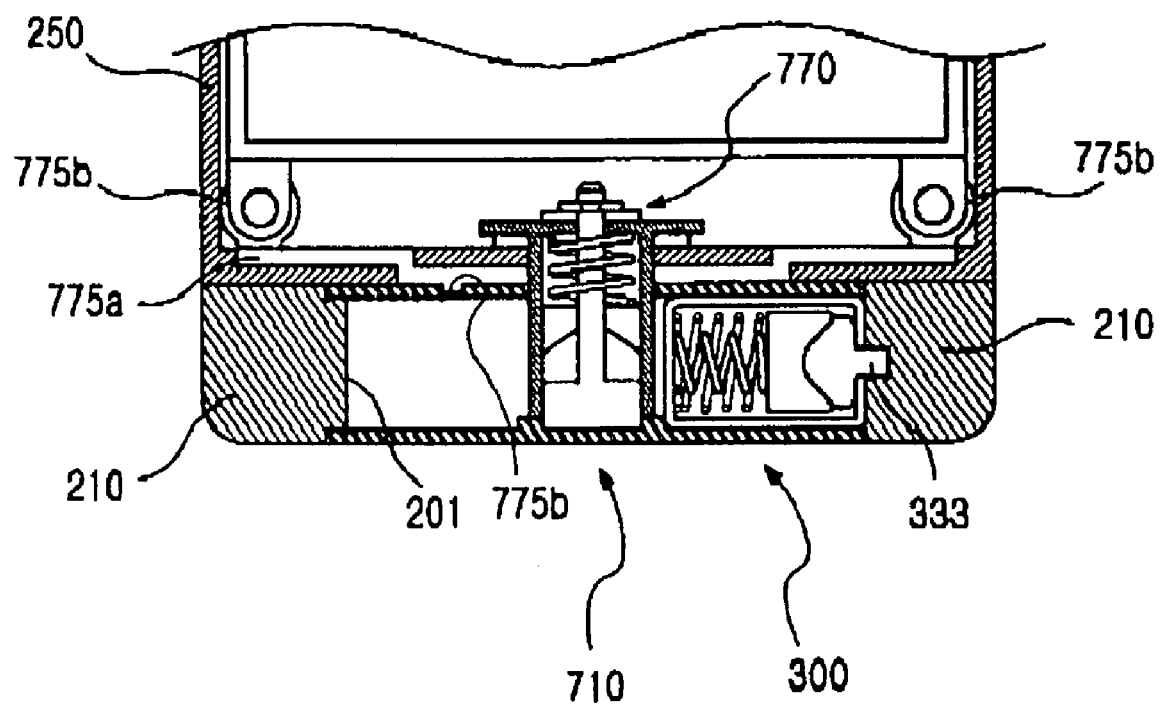
FIG. 14 is a partial sectional view of a portable wireless terminal with which the rotary-type hinge module shown in FIG. 9 is assembled.

FIG. 14 is a partial sectional view of a portable wireless terminal with which the rotary-type hinge module 700 shown in FIG. 9 is assembled. As shown in FIG. 14, the folder-opening hinge module 300 is received in the hinge housing 710 of the rotary-type hinge module 700 according to the third embodiment of the present invention, and the shaft portion 333 of the folder-opening hinge module 300 is assembled with the terminal body 210 of the portable wireless terminal.

Figure 15:
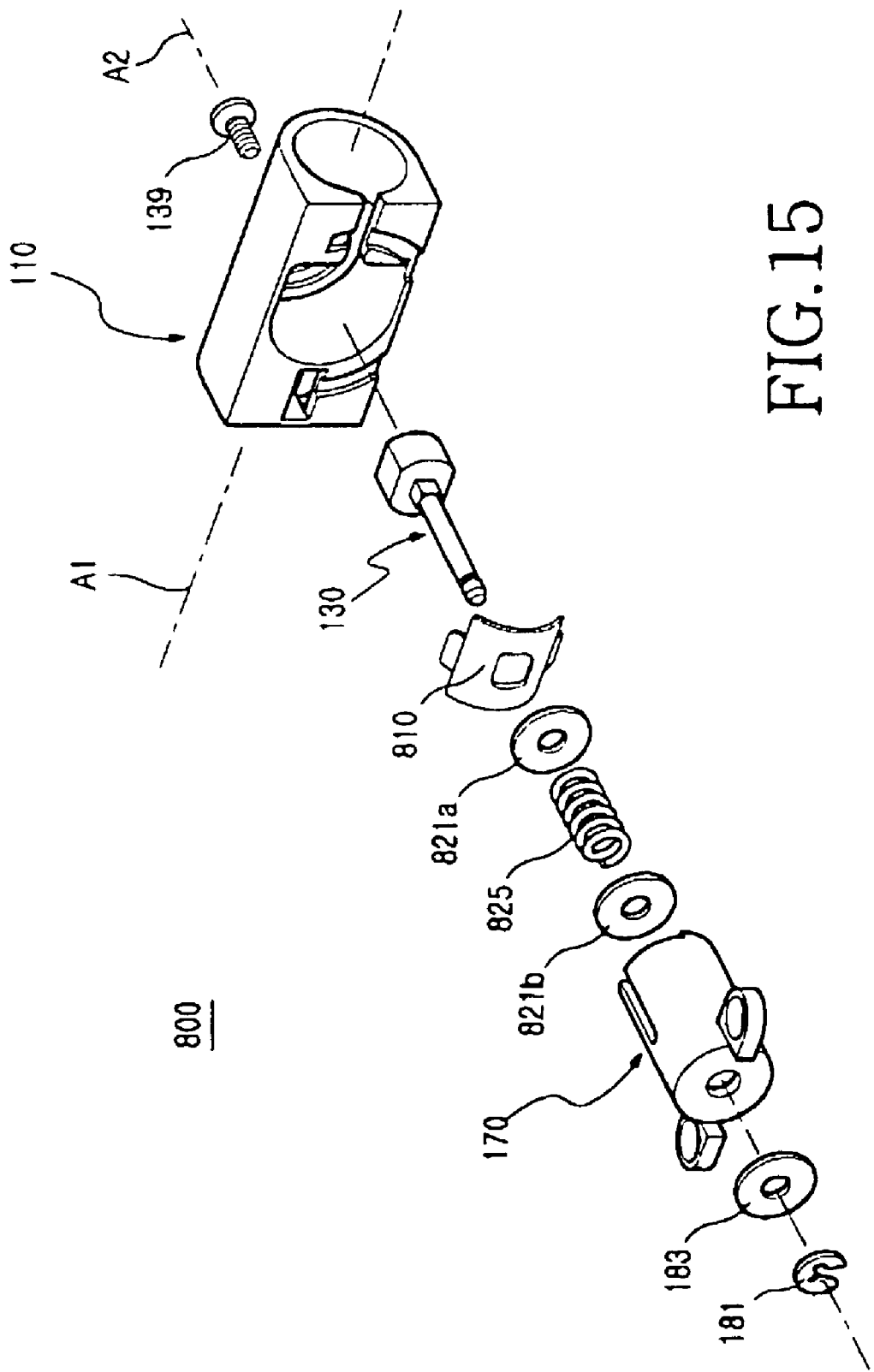
FIG. 15 is an exploded perspective view of a rotary-type hinge module of a portable wireless terminal according to a fourth embodiment of the present invention.
Figure 16:
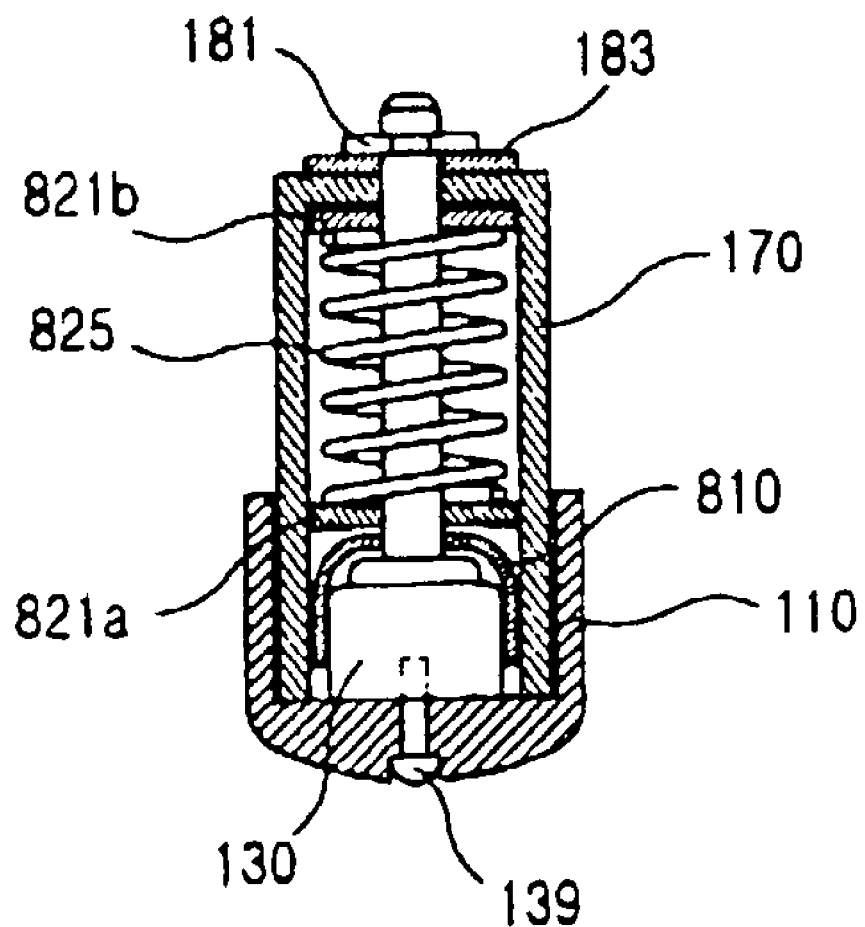
FIG. 16 is a sectional view of the rotary-type hinge module shown in FIG. 15.

FIG. 15 is an exploded perspective view of a rotary-type hinge module 800 of a portable wireless terminal according to a fourth embodiment of the present invention, and FIG. 16 is a sectional view of the rotary-type hinge module 800 shown in FIG. 15. As shown in FIGS. 15 and 16, the rotary-type hinge module 800 of a portable wireless terminal according to the fourth embodiment of the present invention is characterized in that the constructions of the hinge shaft and hinge cam employed in the previous embodiments are replaced by a leaf spring 810 disposed in the rotary shaft 170.

Therefore, the description about the fourth embodiment of the present invention will be given in relation to only the leaf spring 810.

As shown in FIGS. 15 and 16, the rotary-type hinge module 800 according to the fourth embodiment of the present invention includes the leaf spring 810, washers 821a and 821b, and a coil spring 825, which are received in the rotary shaft 170.

The leaf spring 810 is fixedly assembled with the supporting shaft 130 so that the leaf spring 810 is not rotated. The washers 821a and 821b are assembled with the supporting shaft 130, and one washer 821a is in contact with the leaf spring 810 while the other washer 821b is in contact with the inner end of the rotary shaft 170. The two washers 821a and 821b support opposite ends of the coil spring 825.

In the rotary-type hinge module 800 according to the fourth embodiment of the present invention, the rotary shaft 170 can be stopped at any rotated angle by means of the friction between the leaf spring 810 and the washer 821a. That is, while the rotation of the folder can be stopped only at predetermined angles according to the shapes of the mountain- or valley-shaped portions of the hinge cams in the previous rotary-type hinge modules employing the constructions of the hinge shaft and hinge cam, the rotation of the folder can be stopped at any angle in the rotary-type hinge module 800 employing the leaf spring 810 according to the present embodiment.

In the present embodiment, a coil spring is employed in order to ensure friction between the leaf spring and the washer. However, according to other embodiments, a plurality of washers may be received in the rotary shaft 170 instead of using the coil spring, so that the friction is generated only by the elastic force of the leaf spring. Further, the friction can be generated only by the elastic force of the leaf spring by adjusting the length of the inner space of the rotary shaft 170 or the thickness of the washers.

Figure 17:
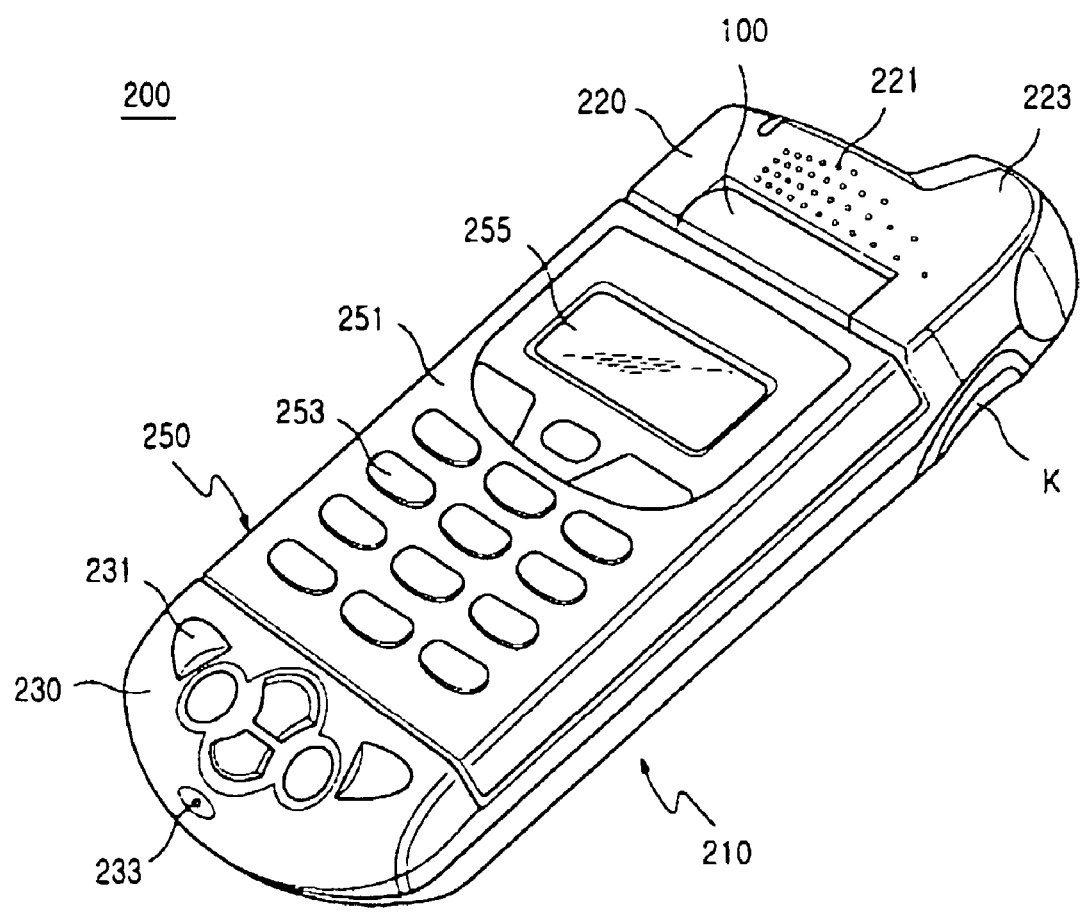
FIG. 17 is a perspective view of a portable wireless terminal employing the rotary-type hinge module according to the present invention, which is in a phone mode.
Figure 18:
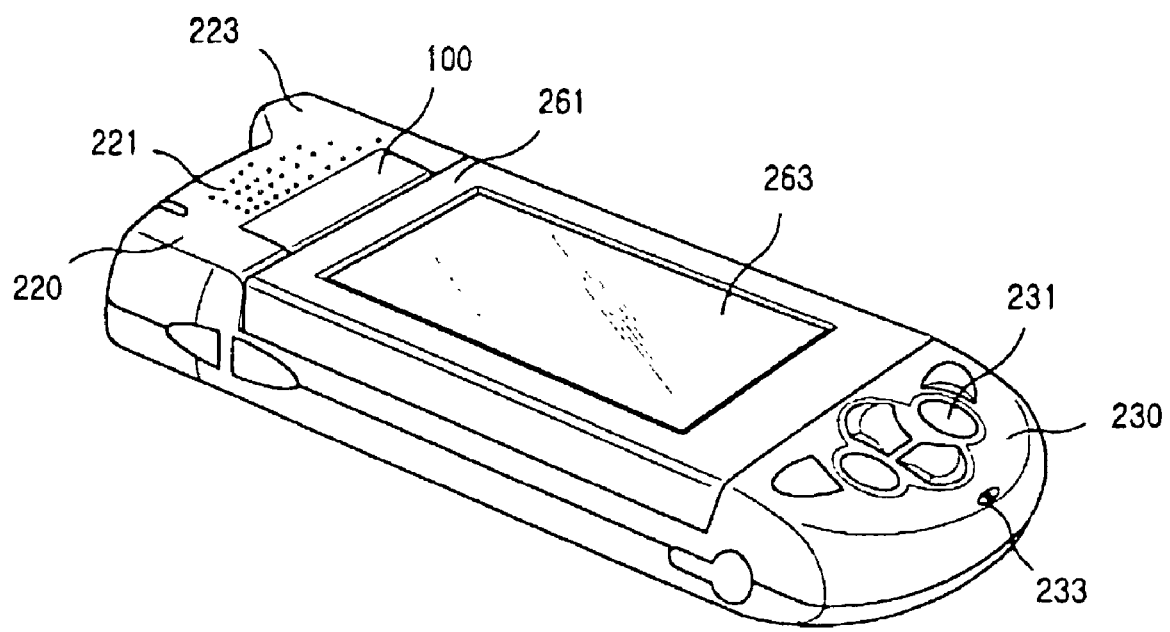
FIG. 18 is a perspective view of the portable wireless terminal shown in FIG. 17, which is in a PDA mode.

FIG. 17 is a perspective view of a portable wireless terminal 200 employing the rotary-type hinge module 100 according to the present invention, which is in a phone mode, and FIG. 18 is a perspective view of the portable wireless terminal 200 shown in FIG. 17, which is in a PDA mode. As shown in FIGS. 17 and 18, the portable wireless terminal 200 employing the rotary-type hinge module 100 (or the other embodiments) according to the present invention includes the terminal body 210 and the folder 250 rotatably assembled with the terminal body 210, such that the front and rear surfaces of the folder 250 can be turned over.

A speaker 221 is disposed on a front upper portion 220 of the terminal body 210, and the rotary-type hinge module 100 is assembled at a predetermined portion of the front upper portion 220. A camera lens-receiving section 223 is disposed at one side of the speaker 221, and a shutter key K for operating the camera lens is disposed on a side portion of the front upper portion 220. Also, a microphone 233 and a lower keypad 231 are disposed on a front lower portion 230 of the terminal body 210. The lower keypad 231 is utilized in selecting and operating various functions when the portable wireless terminal 200 is in the phone mode or PDA mode.

A middle keypad 253, by means of which the portable wireless terminal 200 is operated when the portable wireless terminal 200 is used in the phone mode, and a small display window 255, on which terminal status information, data transmission information, etc., are displayed, are disposed on a front surface 251 of the folder 250. When the portable wireless terminal 200 is used in the PDA mode, the front surface of the folder 250 is turned over, so that a large display window 263 disposed on a rear surface 261 of the folder 250 is exposed. The front and rear surfaces can be turned over when the portable wireless terminal 200 employs the rotary-type hinge module according to the present invention as described above.

Figure 19:
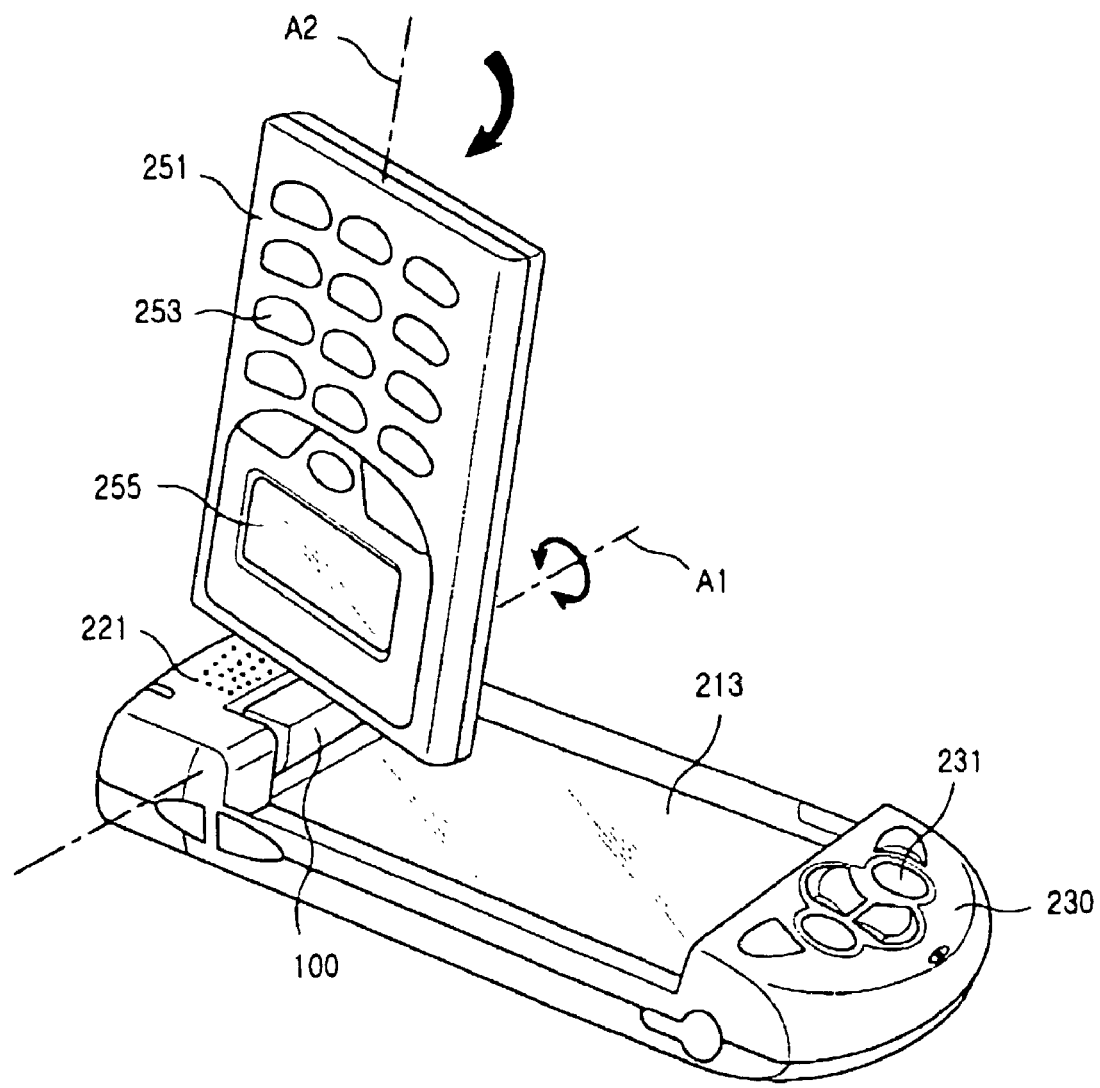
FIG. 19 is a view showing the operation of switching modes of the folder of the portable wireless terminal by turning over the front and rear surfaces of the folder.

FIG. 19 is a view showing the operation of switching modes of the folder 250 of the portable wireless terminal by turning over the front and rear surfaces of the folder 250. This figure shows another display window 213 disposed on a surface of the terminal body 210 between the upper and lower front portions of the terminal body 210, on which the folder 250 is placed when it is closed. The auxiliary display window 213 enables the portable wireless terminal 200 to be used in the PDA mode even when the folder 250 is opened. Further, the auxiliary display window 213 disposed on the terminal body 210 can be utilized as a touch pad, thereby enabling the portable wireless terminal 200 to be used more conveniently in the PDA mode.

In order to turn over the front and rear surfaces of the folder 250, the folder 250 must be first opened from the terminal body 210. In this case, the folder-opening hinge module 300 received in the terminal body 210 is operated to rotate the folder 250 about the first rotation axis A1, thereby opening the folder 250. The turning-over of the front and rear surfaces of the folder 250 can be achieved by rotating the folder 250 about the rotary-type hinge module 100, specifically, rotating the rotary shaft 170 of the rotary-type hinge module 100 about the second rotation axis A2, after the folder 250 is opened. In this case, as described above, the folder 250 together with the hinge shaft 160 and the rotary shaft 170 is automatically rotated up to 180° even when no rotational force is applied when the folder 250 is rotated more than a predetermined angle, due to the elastic force by the elastic means 169 and the curved shapes of the valley-shaped portion 151 and the mountain-shaped portion 161 of the hinge cam 150 and the hinge shaft 160 employed in the rotary-type hinge module 100.

Figure 20:
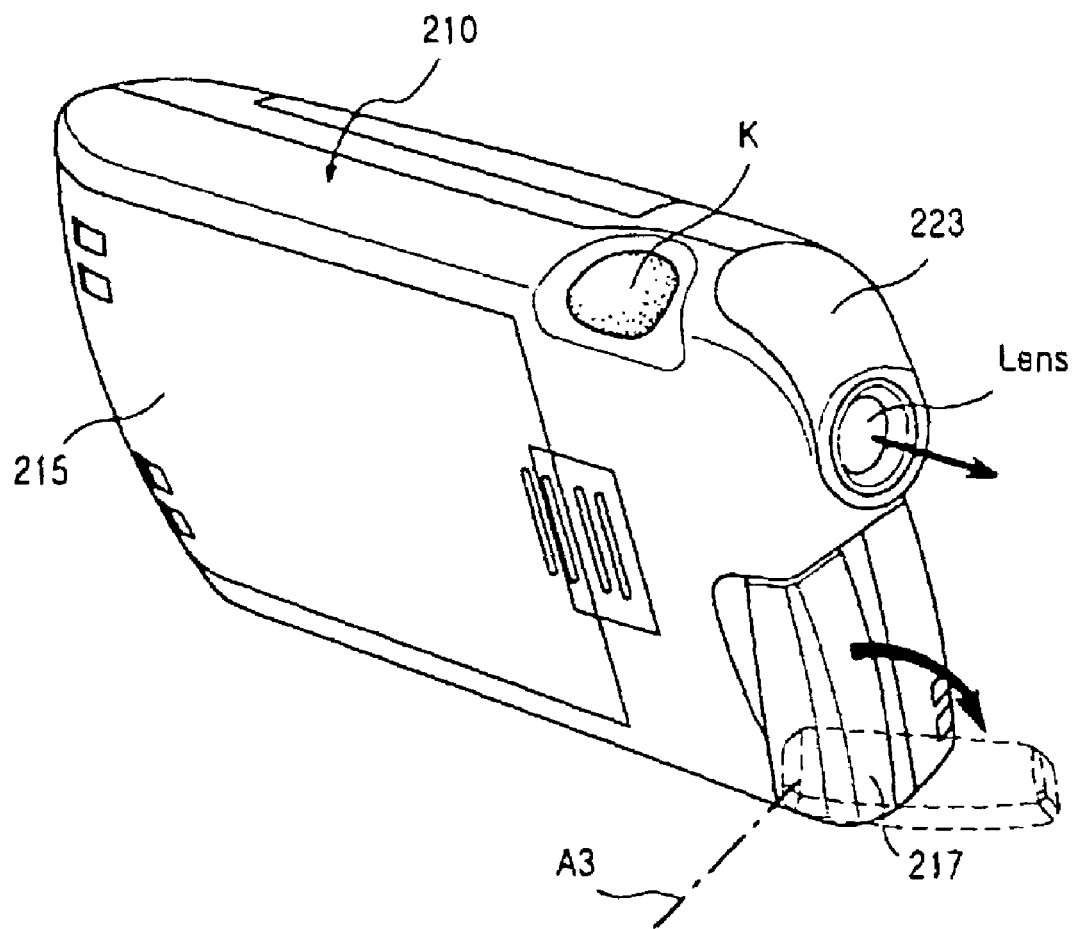
FIG. 20 is a rear perspective view of the portable wireless terminal shown in FIG. 17, which shows a rear surface of the portable wireless terminal.

FIG. 20 is a rear perspective view of the portable wireless terminal 200 shown in FIG. 17, which shows a rear surface 215 of the portable wireless terminal 200. As shown in FIG. 20, the camera lens is received in the camera lens-receiving section 223 while being oriented upward of the terminal body 210. An antenna 217 is disposed at an upper end of the rear surface 215 of the terminal body 210. The antenna 217 may be received in the terminal body 210 while being rotatable about another rotation axis A3, or may be used after being extended out of the terminal body 210 when communication or data transmission is carried out.

In the portable wireless terminal 200 provided with the camera lens as described above, when the large display window 263 is oriented upward of the terminal body 210 in a state that the folder 250 is opened, even an image communication can be performed by means of the camera lens and the large display window 263 of the folder 250. In this case, the camera lens needs not be necessarily oriented upward of the terminal body 210, but it is obvious that the image communication is possible even when the camera lens is oriented in any direction within an angular range allowed by the large display window 263.

As described above, the rotary-type hinge module according to the present invention increases the range or diversifies the modes in which the portable wireless terminal can be used, when it is employed in the portable wireless terminal, especially in the folder-type terminal. For example, proper display and camera lens, which are required in the service of providing dynamic images or image communication according to the diversification of the mobile communication, need not be disposed at a specific position of the terminal but may be disposed at various positions. Further, designs, dimensions, and particulars of the terminal may be easily modified. Moreover, the wireless terminal may be utilized in the phone mode, PDA mode, or any other modes, without a significant change in the opened or closed state of the terminal, so that a user can use the terminal more conveniently.

Although several preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A rotary-type hinge module of a portable wireless terminal, which is disposed between a terminal body and a folder of the portable wireless terminal, the hinge module having a first rotation axis and a second rotation axis perpendicular to each other, the hinge module enabling the folder to rotate about the second rotation axis after the folder is opened from the terminal body, the hinge module comprising:

a hinge housing assembled with the terminal body while being rotatable about the first rotation axis, the hinge housing having a fixing seat and an opening, the fixing seat being formed at a portion of an inner surface thereof, the opening formed through an opposed portion to the fixing seat, the fixing seat being exposed through the opening in the direction of the second rotation axis;

a supporting shaft fixed to the fixing seat of the hinge housing and extending through the opening of the hinge housing;

a hinge cam fixed to the supporting shaft and having at least one valley-shaped portion formed at one side thereof;

a hinge shaft having a mountain-shaped portion formed at one side thereof, a hinge shaft hole passing axially there through, and at least one guide protuberance formed on a circumferential surface of the hinge shaft, the supporting shaft being inserted through the hinge shaft hole;

an elastic means forcing the hinge shaft toward the hinge cam so that the mountain-shaped portion and the valley-shaped portion are in sliding contact with each other; and a rotary shaft having a shape of a cylinder which has an open end and a closed end opposite to each other, the rotary shaft containing the hinge cam, the hinge shaft, and the elastic means, the rotary shaft having at least one guide hole with which the guide protuberance of the hinge shaft is engaged, the rotary shaft having an assembling means to which one end of the folder is fixed.

2. A rotary-type hinge module of a portable wireless terminal as claimed in claim 1, wherein:

the fixing seat is formed by a concave recess in said portion of the inner surface of the hinge housing;

the hinge housing further has a fixing hole formed through a central portion of the fixing seat, the fixing hole extending from the interior to the exterior of the hinge housing; and the supporting shaft is fixed to the fixing seat of the hinge housing by a screw screwed through the fixing hole from the exterior of the hinge housing.

3. A rotary-type hinge module of a portable wireless terminal as claimed in claim 2, wherein the supporting shaft comprises:

a fixed head formed at a lower end of the supporting shaft, the fixed head having a shape corresponding to that of the fixing seat; and a stepped portion having an angular shape and being formed circumferentially around and radially outward from the supporting shaft, the stepped portion extending a predetermined length from the fixed head in an axial direction along the supporting shaft, wherein the hinge cam has a hinge cam hole having a shape corresponding to the angular shape of the stepped portion of the supporting shaft, so that the hinge cam hole securely interfaces with the stepped portion, thereby fixedly assembling the hinge cam with the supporting shaft.

4. A rotary-type hinge module of a portable wireless terminal as claimed in claim 1, wherein the hinge shaft linearly reciprocates in the rotary shaft.

5. A rotary-type hinge module of a portable wireless terminal as claimed in claim 1, wherein:

the supporting shaft has an annular groove formed circumferentially on an outer cylindrical surface of an upper end of the supporting shaft;

the rotary shaft has a shaft hole formed through the closed end thereof, the annular groove being exposed out of the shaft hole when the supporting shaft is inserted through the shaft hole and the upper end of the supporting shaft protrudes through the shaft hole; and an E-ring interfaces around the annular groove exposed out of the shaft hole, so that the rotary shaft is assembled with the supporting shaft.

6. A rotary-type hinge module of a portable wireless terminal as claimed in claim 5, further comprising a washer fitted between the E-ring and the closed end of the rotary shaft.

7. A rotary-type hinge module of a portable wireless terminal as claimed in claim 1, wherein the assembling means of the rotary shaft comprises at least one rib extending laterally outward from a cylindrical outer surface of the closed end of the rotary shaft, the rib having an assembling hole formed therethrough.

8. A rotary-type hinge module of a portable wireless terminal as claimed in claim 1, wherein the assembling means of the rotary shaft comprises assembling wings extending laterally outward from opposite side surfaces of the closed end of the rotary shaft, and ribs extending in a longitudinal direction along the rotary shaft from end portions of the assembling wings, the assembling wings extending a length longer than that of the hinge housing, each of the ribs having an assembling hole.

9. A rotary-type hinge module of a portable wireless terminal as claimed in claim 8, wherein the assembling means further comprises a stopper protruding from a surface of the assembling wings, and the hinge housing has a sliding groove corresponding to a rotation trace of the stopper and formed on an outer surface thereof, so that the stopper is guided along the sliding groove, thereby enabling a range within which the stopper can be rotated to be limited to 180°.

10. A rotary-type hinge module of a portable wireless terminal as claimed in claim 1, wherein the rotary shaft has a predetermined flat surface formed at one side of the closed end thereof.

11. A rotary-type hinge module of a portable wireless terminal as claimed in claim 1, wherein:

the rotary shaft comprises a rotation protuberance longitudinally extending a predetermined length from the open end of the rotary shaft; and the hinge housing has a sliding surface comprising a recess formed around the fixing seat and along a trace corresponding to a rotating trace of the rotation protuberance, the sliding surface receiving and engaging the rotation protuberance, thereby defining rotational limitation of the rotation of the rotary shaft.

12. A rotary-type hinge module of a portable wireless terminal as claimed in claim 11, wherein the sliding surface limits the rotating trace of the rotation protuberance, thereby enabling a range within which the rotary shaft can be rotated to be limited to 180°.

13. A rotary-type hinge module of a portable wireless terminal as claimed in claim 1, wherein the hinge housing further comprises:

a holding pin hole formed through one end thereof and a hinge shaft hole formed through the other end thereof in a direction of the first rotation axis.

14. A rotary-type hinge module of a portable wireless terminal as claimed in claim 1, wherein:

the valley-shaped portion of the hinge cam and the mountain-shaped portion of the hinge shaft each have a curved surface opposed to each other.

15. A rotary-type hinge module of a portable wireless terminal as claimed in claim 1, wherein:

the elastic means is supported by the closed end of the rotary shaft.

16. A rotary-type hinge module of a portable wireless terminal, for rotatably assembling a terminal body and a folder of the portable wireless terminal with each other, the hinge module comprising:

a hinge housing rotatably assembled with the terminal body;

a supporting shaft formed integrally with and extending outward from a portion of an inner surface of the hinge housing in a direction opposed to said portion;

a first slip washer having a first washer hole formed longitudinally through a central portion thereof, by which the first slip washer is fixedly assembled with the supporting shaft;

a second slip washer having a first washer hole formed longitudinally through a central portion thereof, by which the second slip washer is rotatably fitted around the supporting shaft while being in surface contact with the first slip washer;

an elastic means assembled with the supporting shaft and supporting the second slip washer, so that the elastic means provides elastic force in a direction which forces the first and second slip washers to be in tighter contact with each other; and a rotary shaft having a shape of a cylinder which has an open end and a closed end opposite to each other, the rotary shaft containing the first and second slip washers and the elastic means, which are assembled with the supporting shaft, the rotary shaft being assembled with the supporting shaft in such a manner that the rotary shaft can be rotated together with the second slip washer, thereby rotating the folder.

17. A rotary-type hinge module of a portable wireless terminal as claimed in claim 16, wherein:

the supporting shaft comprises a stepped portion having an angular shape and being formed circumferentially around and radially outward from the supporting shaft, the stepped portion extending a predetermined length from said portion of the inner surface of the hinge housing; and the first slip washer has a first washer hole having a shape corresponding to the angular shape of the stepped portion, so that the first slip washer snugly fits around the stepped portion, thereby being fixedly assembled with the supporting shaft.

18. A rotary-type hinge module of a portable wireless terminal as claimed in claim 16, wherein the first slip washer has at least one washer groove formed on an outer circumferential surface thereof, and the second slip washer has at least one guide protuberance corresponding to the washer groove, so that the guide protuberance and the washer groove engage each other, thereby performing a latch function, thereby requiring a threshold rotational force to be applied when the second slip washer is rotated.

19. A rotary-type hinge module of a portable wireless terminal as claimed in claim 16, wherein:
- the second slip washer has at least one guide protuberance formed on an outer circumferential surface thereof, and the rotary shaft has at least one guide hole corresponding to the guide protuberance; and
- the guide hole extending longitudinally from the open end of the rotary shaft and radially through a sidewall of the rotary shaft, wherein
- the second slip washer can linearly reciprocate in the rotary shaft.

20. A rotary-type hinge module of a portable wireless terminal as claimed in claim 16, wherein:
- the supporting shaft has an annular groove formed circumferentially on an outer cylindrical surface of the an upper end of the supporting shaft;
- the rotary shaft has a shaft hole formed through the closed end thereof, the annular groove being exposed out of the shaft hole when the supporting shaft is inserted through the shaft hole and the upper end of the supporting shaft comes out of the shaft hole; and
- an E-ring is fitted around the annular groove exposed out of the shaft hole, so that the rotary shaft is assembled with the supporting shaft.

21. A rotary-type hinge module of a portable wireless terminal as claimed in claim 20, further comprising a washer fitted between the E-ring and the closed end of the rotary shaft.

22. A rotary-type hinge module of a portable wireless terminal as claimed in claim 16, wherein the rotary shaft comprises at least one rib extending laterally outward from a cylindrical outer surface of the closed end of the rotary shaft, the rib having an assembling hole formed therethrough.

23. A rotary-type hinge module of a portable wireless terminal, for rotatably assembling a terminal body and a folder of the portable wireless terminal with each other, the hinge module comprising:
- a hinge housing rotatably assembled with the terminal body;
- a supporting shaft fixed to and extending outward from a portion of an inner surface of the hinge housing in a direction opposed to said portion;
- a leaf spring having a leaf spring hole formed through a central portion thereof, through which the supporting shaft is fitly inserted, so that the leaf spring is fixedly assembled with the supporting shaft;
- a first washer fitted around the supporting shaft so that friction is generated between the first washer and the leaf spring when the leaf spring is rotated;
- a coil spring assembled with the supporting shaft and supporting the first washer, so that the coil spring provides elastic force in a direction which forces the first washer and the leaf spring in tighter contact with each other; and
- a rotary shaft having a shape of a cylinder which has an open end and a closed end opposite to each other, the rotary shaft containing the leaf spring, the first washer, and the coil spring, which are assembled with the supporting shaft, the coil spring being supported by the closed end of the rotary shaft, the rotary shaft being assembled with the supporting shaft in such a manner that the rotary shaft can rotate the folder.

24. A rotary-type hinge module of a portable wireless terminal as claimed in claim 23, further comprising a second washer fitted between the coil spring and the closed end of the rotary shaft.

25. A rotary-type hinge system of a portable wireless terminal, for rotatably assembling a terminal body and a folder of the portable wireless terminal with each other, the hinge system comprising:
- a folder-opening hinge module providing a first rotation axis about which the folder can be rotated when the folder is opened or closed with respect to the terminal body; and
- a rotary-type hinge module having a hinge housing rotatably assembled with the terminal body by the folder-opening hinge module in such a manner that the hinge housing can be rotated about the first rotation axis, a supporting shaft fixed to and extending outward from a portion of an inner surface of the hinge housing in a direction opposed to said portion, and a rotary shaft having a shape of a cylinder which has an open end and a closed end opposite to each other;
- wherein the rotary shaft is assembled with the supporting shaft in such a manner that the rotary shaft can be rotated so as to form a second rotation axis perpendicular to the first rotation axis and is assembled with the folder thereby enabling the folder to be rotated about the second rotation axis in a state where the folder is opened from the terminal body while being assembled with the terminal body.

26. A rotary-type hinge system of a portable wireless terminal as claimed in claim 25, wherein the folder-opening hinge module comprises:
- a module housing received in the terminal body, the module housing having a receiving space one side of which is opened, the module housing having guide grooves formed on inner side surfaces thereof and a first hinge shaft hole formed through one end thereof;
- a first hinge cam having guide protuberances formed on side surfaces thereof and corresponding to the guide grooves of the module housing, so that the first hinge cam linearly moves in the module housing, the first hinge cam having a valley-shaped portion formed at one end thereof;
- a first hinge shaft including a mountain-shaped portion formed at one end thereof, which corresponds to the valley-shaped portion of the first hinge cam, and a shaft portion formed at the other end thereof and protruding out of the module housing through the first hinge shaft hole of the module housing; and
- an elastic means disposed and supported between the other end of the module housing and the other end of the first hinge cam, thereby applying elastic force to the first hinge cam in a direction of forcing the first hinge cam and the first hinge shaft to be in tighter contact with each other, wherein
- the shaft portion of the first hinge shaft is assembled with the rotary-type hinge module, so that the rotary-type hinge module and the first hinge shaft are rotated together when the folder is opened or closed.

27. A rotary-type hinge system of a portable wireless terminal as claimed in claim 25, wherein the folder-opening hinge module comprises:

a module housing received in the terminal body, the module housing having a receiving space one side of which is opened, the module housing having guide grooves formed on inner side surfaces thereof and a first hinge shaft hole formed through one end thereof;

a first hinge cam having guide protuberances formed on side surfaces thereof and corresponding to the guide grooves of the module housing, so that the first hinge cam linearly moves in the module housing, the first hinge cam having a valley-shaped portion formed at one end thereof;

a first hinge shaft including a mountain-shaped portion formed at one end thereof, which corresponds to the valley-shaped portion of the first hinge cam, and a shaft portion formed at the other end thereof and protruding out of the module housing through the first hinge shaft hole of the module housing; and an elastic means disposed and supported between the other end of the module housing and the other end of the first hinge cam, thereby applying elastic force to the first hinge cam in a direction of forcing the first hinge cam and the first hinge shaft to be in tighter contact with each other, wherein the shaft portion of the first hinge shaft is fixed to the terminal body, so that the first hinge shaft is rotated with respect to the folder when the folder is opened or closed.

28. A rotary-type hinge system of a portable wireless terminal as claimed in claim 25, wherein the rotary-type hinge module further comprises:

a hinge cam having a valley-shaped portion formed in a diametric direction at one side thereof, the hinge cam having a hinge cam hole formed therethrough, by which the hinge cam is fixedly assembled with the supporting shaft;

a hinge shaft having a mountain-shaped portion formed in a diametric direction at one side thereof and corresponding to the valley-shaped portion of the hinge cam, the hinge shaft having a hinge shaft hole formed therethrough, by which the hinge shaft is rotatably assembled with the supporting shaft; and an elastic means assembled with the supporting shaft and supporting the hinge shaft, thereby providing elastic force in a direction which forces the mountain-shaped portion of the hinge shaft and the valley-shaped portion of the hinge cam to be in tighter contact with each other;

wherein the hinge cam, the hinge shaft, and the elastic means are contained in the rotary shaft and are assembled with the supporting shaft, the elastic means being supported by the closed end of the rotary shaft.

29. A rotary-type hinge system of a portable wireless terminal as claimed in claim 28, wherein:

the rotary shaft provides an assembling means with which the folder is assembled, the assembling means comprising assembling wings extending laterally outward from opposite side surfaces of the closed end of the rotary shaft, and ribs extending in a longitudinal direction along the rotary shaft from end portions of the assembling wings, the assembling wings extending a length longer than that of the hinge housing, each of the ribs having an assembling hole; and the folder further comprises a frame received therein, which has assembling holes corresponding to the assembling holes of the ribs, which enable the frame to be fixed to the rotary shaft.

30. A rotary-type hinge module of a portable wireless terminal as claimed in claim 29, wherein the assembling means further comprises a stopper protruding from a surface of the assembling wings, and the hinge housing having a sliding groove corresponding to a rotation trace of the stopper and formed on an outer surface thereof, so that the stopper is guided along the sliding groove, thereby enabling a range within which the stopper can be rotated to be limited to 180°.

31. A rotary-type hinge system of a portable wireless terminal as claimed in claim 28, wherein the hinge housing further has a receiving hole for receiving the folder-opening hinge module formed at one end thereof.

32. A rotary-type hinge module of a portable wireless terminal, which is disposed between a terminal body and a folder of the portable wireless terminal, the hinge module having a first rotation axis and a second rotation axis perpendicular to each other, the hinge module enabling the folder to rotate about the second rotation axis after the folder is opened from the terminal body, the hinge module comprising:

a hinge housing assembled with the terminal body while being rotatable about the first rotation axis, the hinge housing having a holding pin hole formed through one end thereof and a hinge shaft hole formed through the other end thereof in a direction of the first rotation axis, the hinge housing having a fixing seat and an opening, the fixing seat being formed at a portion of an inner surface thereof in a direction of the second rotation axis, the opening formed through an opposed portion to the fixing seat, the fixing seat being exposed through the opening in the direction of the second rotation axis;

a supporting shaft fixed to the fixing seat of the hinge housing and extending through the opening of the hinge housing;

a hinge cam fixed to the supporting shaft and having at least one valley-shaped portion formed at one side thereof, the valley-shaped portion having a curved surface;

a hinge shaft having a mountain-shaped portion formed at one side thereof and a hinge shaft hole passing axially therethrough, the mountain-shaped portion having a curved surface, the supporting shaft being inserted through the hinge shaft hole so that the hinge shaft is fitted around the supporting shaft in such a manner that the curved surface of the mountain-shaped portion is opposed to the curved surface of the at least one valley-shaped portion, the hinge shaft having at least one guide protuberance formed on a circumferential surface of the hinge shaft;

an elastic means forcing the hinge shaft toward the hinge cam so that the curved surfaces of the mountain-shaped portion and the valley-shaped portion are in sliding contact with each other; and a rotary shaft having a shape of a cylinder which has an open end and a closed end opposite to each other, the rotary shaft containing the hinge cam, the hinge shaft, and the elastic means, the elastic means being supported by the closed end of the rotary shaft, the rotary shaft having at least one guide hole with which the at least one guide protuberance of the hinge shaft is engaged, the rotary shaft having an assembling means to which one end of the folder is fixed.

* * * * *

UNITED STATES PATENT AND TRADEMARK OFFICE
CERTIFICATE OF CORRECTION

| | |
|---|---|
| PATENT NO. | : 7,006,853 B2 |
| APPLICATION NO. | : 10/226712 |
| DATED | : February 28, 2006 |
| INVENTOR(S) | : Sung-Ill Kang et al. |

It is certified that error appears in the above-identified patent and that said Letters Patent is hereby corrected as shown below:

Title page, (30) Foreign Application Priority Data

June 15, 2002 (KR) ……. 2002-41354  should be

July 15, 2002 (KR) …….. 2002-41354

Signed and Sealed this

First Day of August, 2006

JON W. DUDAS
*Director of the United States Patent and Trademark Office*